United States Patent
Golomb

(10) Patent No.: US 10,272,939 B2
(45) Date of Patent: *Apr. 30, 2019

(54) INTEGRATED VEHICLE CONTROL SYSTEM AND APPARATUS

(71) Applicant: Golomb Mercantile Company LLC, Las Vegas, NV (US)

(72) Inventor: Adam Simon Golomb, Las Vegas, NV (US)

(73) Assignee: Golomb Mercantile Company LLC, Las Vegas, NV (US)

( * ) Notice: Subject to any disclaimer, the term of this patent is extended or adjusted under 35 U.S.C. 154(b) by 255 days.

This patent is subject to a terminal disclaimer.

(21) Appl. No.: 15/004,203

(22) Filed: Jan. 22, 2016

(65) Prior Publication Data
US 2016/0137217 A1    May 19, 2016

Related U.S. Application Data

(63) Continuation of application No. 14/030,444, filed on Sep. 18, 2013, now Pat. No. 9,272,724, which is a
(Continued)

(51) Int. Cl.
*G06F 7/00* (2006.01)
*B60Q 1/34* (2006.01)
(Continued)

(52) U.S. Cl.
CPC ........... *B62D 1/046* (2013.01); *B60Q 1/0082* (2013.01); *B60Q 1/343* (2013.01); *B60Q 1/40* (2013.01); *F16H 59/02* (2013.01)

(58) Field of Classification Search
CPC ...................................... B62D 1/046
(Continued)

(56) References Cited

U.S. PATENT DOCUMENTS

| 1,651,540 A | 12/1927 | Park |
| 2,068,632 A | 1/1936 | Stites |

(Continued)

FOREIGN PATENT DOCUMENTS

| DE | 44 23 744 A1 | 4/1995 |
| DE | 4428369 | 2/1996 |

(Continued)

OTHER PUBLICATIONS

"Hands-On: A Practical Measure of the Perceived Risk of the Driving Context," J.A. Thomas & D. Walton, Opus Central Laboratories, Transit NZIHT 7th Annual Conference, pp. 1-10.
(Continued)

*Primary Examiner* — Mahmoud S Ismail
(74) *Attorney, Agent, or Firm* — Clark Hill PLC

(57) ABSTRACT

This invention provides a system which integrates motor vehicle component operation into actuators located in the rim of a vehicle steering wheel. The two system actuators are located in the steering wheel at the three o'clock and 12 o'clock positions for the right-hand actuator and the nine o'clock and 12 o'clock positions for the left-hand actuator. The actuators may operate in parallel with a conventional stalk switch or controls associated with an onboard computer and only operate a vehicle component when activated and subsequently depressed. The invention further provides for vehicle component operation which does not require a driver to remove his or her hands from the steering wheel. Furthermore, the system and apparatus of the invention when integrated with steering wheel and vehicle position detection systems provides a means to disengage an activated turn signal depending on the position of the steering wheel and/or the vehicle.

55 Claims, 17 Drawing Sheets

Related U.S. Application Data continuation-in-part of application No. 13/859,962, filed on Apr. 10, 2013, now Pat. No. 9,266,551, which is a continuation of application No. 13/465,468, filed on May 7, 2012, now Pat. No. 8,446,265, which is a continuation-in-part of application No. 12/555,477, filed on Sep. 8, 2009, now Pat. No. 8,198,996.

(51) Int. Cl.
  *B62D 1/04* (2006.01)
  *B60Q 1/00* (2006.01)
  *B60Q 1/40* (2006.01)
  *F16H 59/02* (2006.01)

(58) Field of Classification Search
  USPC .......................................... 701/36; 340/475
  See application file for complete search history.

(56) References Cited

U.S. PATENT DOCUMENTS

| | | | |
|---|---|---|---|
| 2,291,159 | A | 7/1942 | Jacobi |
| 4,567,217 | A | 1/1986 | Yamazaki et al. |
| 5,198,629 | A | 3/1993 | Hayashi et al. |
| 5,614,884 | A | 3/1997 | Evans |
| 5,666,102 | A | 9/1997 | Lahiff |
| 5,762,853 | A | 6/1998 | Harris et al. |
| 5,823,666 | A | 10/1998 | Kingsolver |
| 6,034,600 | A | 3/2000 | Browne et al. |
| 6,144,297 | A | 11/2000 | Donner |
| 6,876,300 | B2 | 4/2005 | Ponziami |
| 6,961,644 | B2 | 11/2005 | Mercier et al. |
| 7,703,570 | B2 | 4/2010 | Ringger et al. |
| 7,845,457 | B2 | 12/2010 | Baluch et al. |
| 8,198,996 | B2 | 6/2012 | Golomb |
| 8,446,265 | B2 | 5/2013 | Golomb |
| 2005/0021190 | A1 | 1/2005 | Worrell et al. |
| 2006/0044129 | A1 | 3/2006 | Patel |
| 2006/0097372 | A1* | 5/2006 | Webster ............... H01L 23/055 257/678 |
| 2007/0198145 | A1* | 8/2007 | Norris ...................... B60T 7/22 701/23 |
| 2010/0175499 | A1 | 7/2010 | Freeman et al. |
| 2011/0057785 | A1* | 3/2011 | Golomb ............... B60Q 1/0082 340/475 |
| 2012/0109463 | A1 | 5/2012 | Elkins et al. |
| 2012/0221200 | A1 | 8/2012 | Golomb |
| 2012/0232751 | A1* | 9/2012 | Guspan ................. B62D 1/046 701/36 |
| 2012/0283894 | A1 | 11/2012 | Naboulsi |

FOREIGN PATENT DOCUMENTS

| | | |
|---|---|---|
| DE | 197 39 626 A1 | 6/1998 |
| DE | 199 27 464 A1 | 12/2000 |
| DE | 10 2005 025993 A1 | 7/2006 |
| DE | 10 2007 020936 A1 | 12/2008 |
| EP | 0 532 840 A2 | 3/1993 |
| EP | 1 216 911 A2 | 6/2002 |
| EP | 1 502 835 A1 | 2/2005 |
| GB | 1 381 947 A | 1/1975 |
| JP | 07069220 | 3/1995 |
| JP | 2000-228126 A | 8/2000 |
| JP | 2002254950 | 9/2002 |
| JP | 2003531046 | 10/2003 |
| JP | 2006341729 | 12/2006 |
| JP | 2008-087566 A | 4/2008 |
| JP | 2008242960 | 10/2008 |
| JP | 2009132248 | 6/2009 |
| JP | 2011001038 | 1/2011 |
| NO | 97/28987 A1 | 8/1997 |
| WO | 2011031543 A1 | 3/2011 |

OTHER PUBLICATIONS

Audi of America, LLC, "Audi Dynamic Steering", Service Training, Course No. 992803, 2008, pp. 1-33, USA.
Audi AG, "Welcome to the World of Audi, Audi Dynamic Steering Defined", 2014, http://www.audi.com/index.html, pp. 1-8.
BMW, "Technology Guide: Dynamic Stability Control (DSC)", http://www.bmw.com/com/en/insights/technology/echnology_guide/articles/bmw, pp. 1-11.
National Highway Traffic Safety Administration, latest research reports, http://www.nhtsa.gov/, pp. 1-2.
National Highway Traffic Safety Administration, 49 CFR Parts 571 and 585, Federal Motor Vehicle Safety S, Docket No. NHTSA 2005-22251, RIN 2127-AJ70, pp. 1-92.
Bourns, Inc., Press Release, May 10, 2011, pp. 1-2, Riverside, CA.
Car and Driver, Electric Feel: Nissan Digitizes Steering, but the Wheel Remains, K.C. Colwell, Jan. 2013, pp. 1-7.
Ford Motor Company, "New Ford Fusion Redefines Midsize Sedan Expectations with Unprecedented Suite of Driver Assist Technologies," May 10, 2012, pp. 1-4, Dearborn, Michigan.
Ford Motor Company, "Electric Power-Assisted Steering", p. 1.
Gentex Corporation, "Gentex Shipping New Multi-Function Camera with Driver-Assist Features to Ford", May 16, 2012, pp. 1-2, Zeeland, Michigan.
Mobileye, "Company Overview", Mobileye, 2013, pp. 1-2.
Mobileye, "OEM Launches", pp. 1-2.
Mobileye, "Tier 1", Mobileye, pp. 1-2,2013.
Mobileye, "Artificial Vision Technology", Mobileye, pp. 1-2, 2013.
Denso Corporation, "Lane Keeping Assist System", pp. 1-2.
Denso Corporation, "Denso Develops New Vision Sensor for Active Safety Systems", Denso Corporation, News Release, 2014, pp. 1-2.
Bosch Group, Press Release on the steering-angle sensor of the LWS6, pp. 1-2.
A Large-area, Flexible Pressure Sensor Matrix with Organic Field-effect Transistors for Artificial Skin Applications, Someya, et al. PNAS Jul. 6, 2004, vol. 101, No. 27, pp. 9966-9970.
"Luna Innovations Fiber Optic Pressure Sensor," Trevor Rice, Luna Innovations (4 pages).
Web Page printout 5 DOF Haptic Wand/Specialty (1 page).
RLP Engineering, Intellitum, "A Brief History of Turn Signals", www.ripengineering.com/history.htm (2 pages).
Tapecon Membrane Switch Division, Tapecon, Inc., product/marketing brochure (16 pages).
SmartMotorist.com "Where to Put Hands on the Steering Wheel?" (4 pages).
Master Molded Products Corporation, In-Mold Technology,product/marketing brochure (6 pages).
International Search Report and the Written Opinion of the International Searching Authority conducted for PCT/US12/51464, dated Nov. 2, 2012.
International Search Report and Written Opinion, for Application No. PCT/US2014/054204, dated Dec. 23, 2014 from the International Searching Authority.
Bosch Corporation, The Multi Purpose Camera (MPC), Robert Bosch GmbH, p. 1.

* cited by examiner

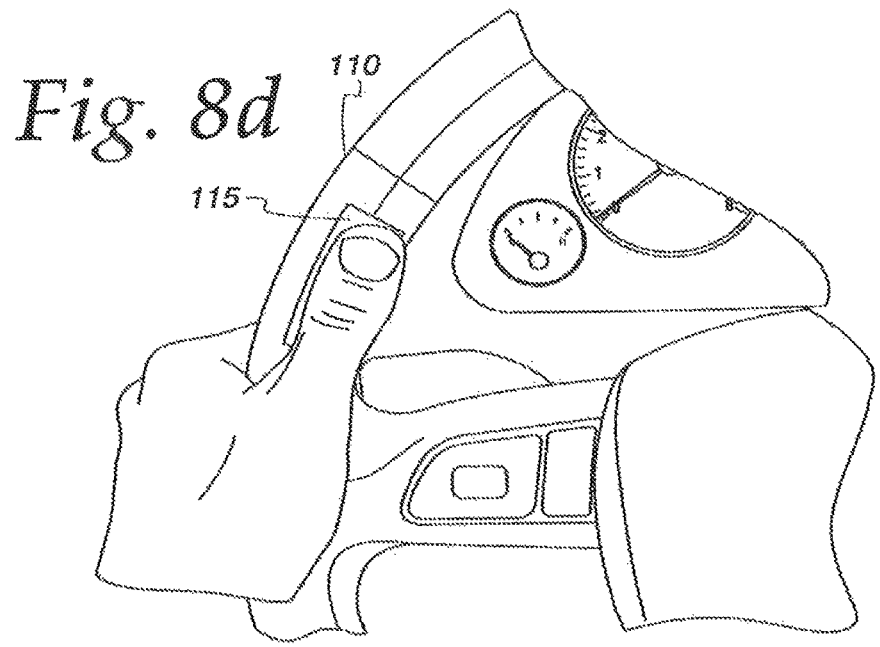
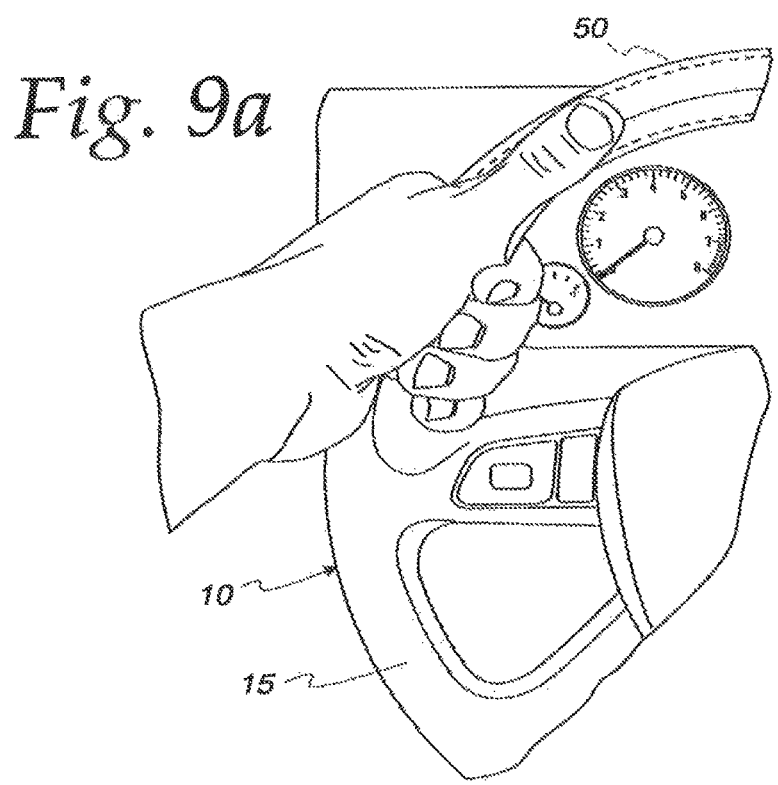

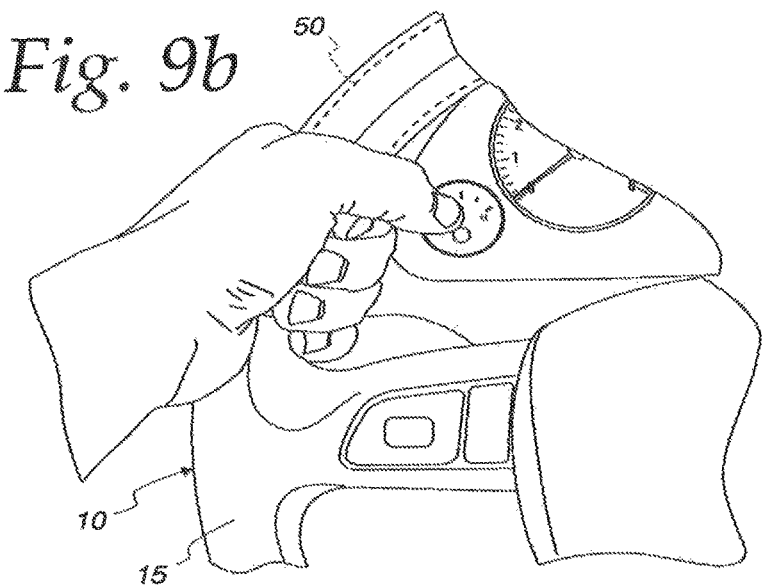
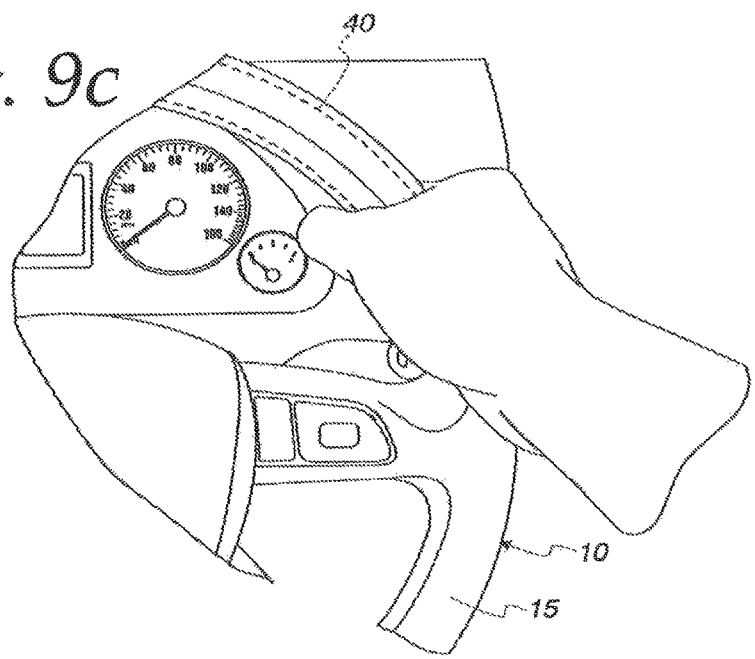

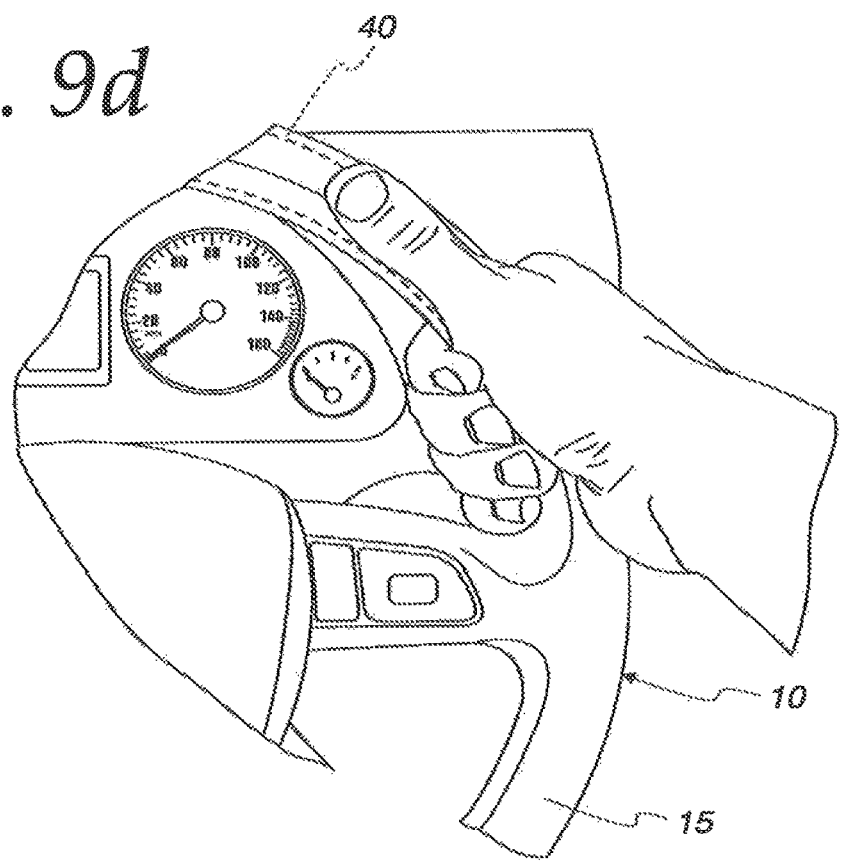

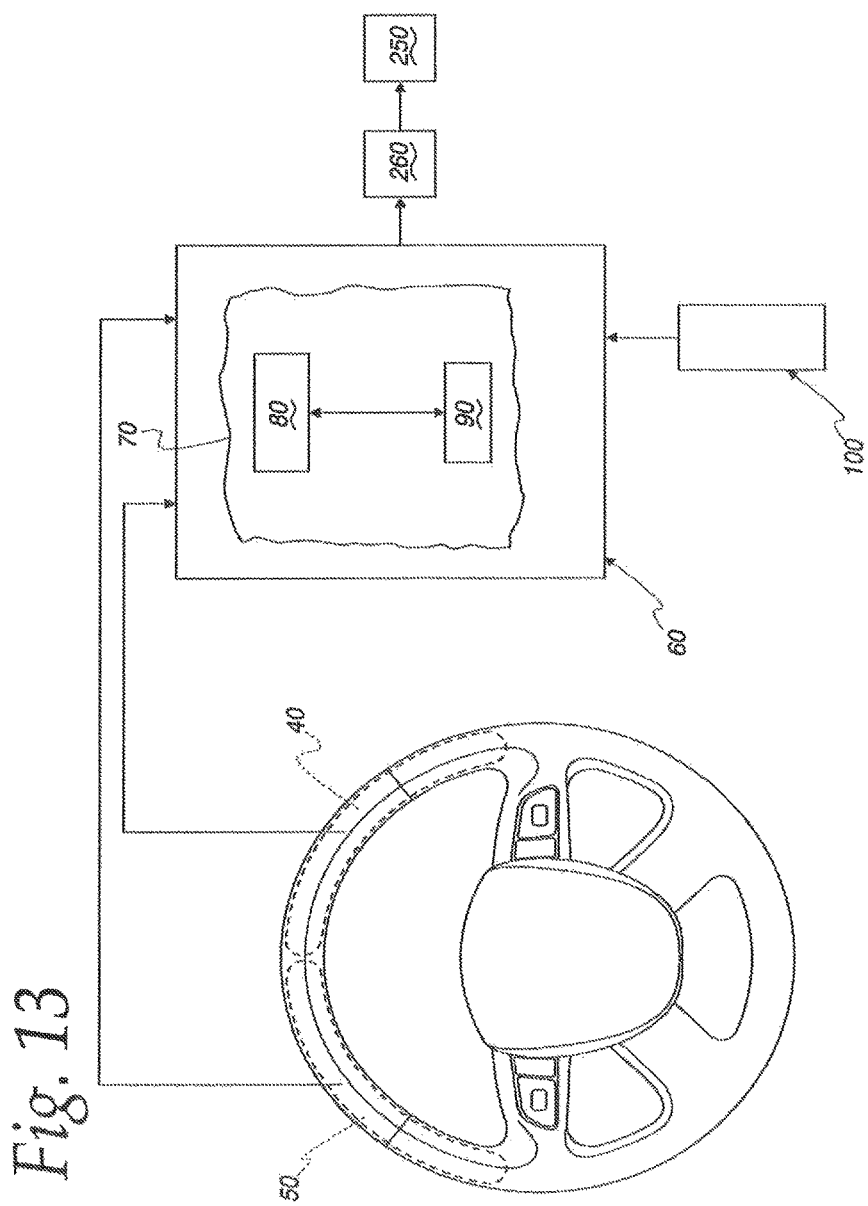

INTEGRATED VEHICLE CONTROL SYSTEM AND APPARATUS

CROSS REFERENCE TO RELATED APPLICATION

This application is a continuation of U.S. patent application Ser. No. 14/030,444, filed Sep. 18, 2013, which is a continuation-in-part of U.S. patent application Ser. No. 13/859,962, which is a continuation of U.S. patent application Ser. No. 13/465,468 filed May 7, 2012 and issued as U.S. Pat. No. 8,446,265 on May 21, 2013, which is a continuation-in-part of U.S. patent application Ser. No. 12/555,477 filed Sep. 8, 2009 and issued as U.S. Pat. No. 8,198,996 on Jun. 12, 2012, which are incorporated herein by reference to the extent allowed by law.

FIELD OF THE INVENTION

The present invention relates to a vehicle control system and apparatus for operating the vehicle's components that is integrated into the rim of a vehicle's steering wheel in such a way as to be fully operable without a driver of the vehicle being required to remove his/her hands from the steering wheel.

BACKGROUND OF THE INVENTION

Vehicle turn signals, while having been in use on commercially available motor vehicles for about 70 years, have changed little since their first application. More recently, vehicles have been equipped with computer-operated functionality which allows the vehicle's driver or operator to control the vehicle's radio, compact disc player, connected devices, cellular telephone and navigation system, and other components through a central controller.

A vehicle steering wheel is commonly comprised of a column, central hub and annular ring with various components including a turn signal activation switch or switches. Typically turn signal lights are operated by a "stalk switch" or lever located to one side of the steering wheel. The stalk switch is moved upward to signal a right-hand turn and downward to signal a left-hand turn. When the stalk switch is moved up, lights located generally in the front and rear right side fenders begin to blink. Similarly, when the stalk switch is moved down, lights located generally in the front and rear left side fenders begin to blink. More typically, the stalk switch includes four positions, two up and two down. The first positions, either up or down, operate the turn signals but the stalk switch returns to the off position, or center, when released. The second of the positions maintains the turn signals on even when the stalk switch is released and shuts off after the steering wheel has been turned a fixed rotation and then returned to an approximately "wheels straight" position.

With the mechanism described above, several well-known problems arise. For example, turn signals may be left on with the signal lights "blinking" well after a turn is completed. A common condition is that signal lights turn off prematurely if the steering wheel is momentarily turned even slightly away from the direction of the turn. Another common condition is the failure of a turn signal to engage if the steering wheel is slightly turned in one direction and the driver attempts to signal a turn in the opposite direction. Such problems have existed since the turn signal was first installed on a motor vehicle.

Recent advances have addressed different physical configurations and different control mechanisms for improving on the operation of the turn signal. For example, more sophisticated in-vehicle computer hardware, such as those systems offered by RLP Engineering, Dayton, Ohio, has allowed for the real-time management of turn signal operation to address problems such as those described above. In such a system, vehicle speed, steering wheel position and other data are monitored in real time to determine whether the vehicle is turning and when the turn has been completed. However, even in such a computer-based system, the turn signal is activated by moving a stalk switch up or down to turn on the switch and the corresponding turn signal light. The turn signal of this computer-based system can be manually switched off by a button on the stalk switch. One disadvantage of this system is that one hand must be removed from the steering wheel in order to operate the stalk switch.

Other modifications of the turn signal have focused on replacing the stalk switch with buttons or paddles located in the hub of the steering wheel, such as the apparatuses illustrated in U.S. Pat. No. 5,739,491 to Crosson, Jr. and U.S. Patent Application Publication 2009/01655592 to Sakai et al. However, such modifications do not address the disadvantages described above. Specifically, placing the turn signal activation switches in the hub of the steering wheel still requires the driver either to remove one hand from the steering wheel or to release his grasp on the wheel in order to operate the hub-mounted switch. Such modifications also do not address problems arising when the turn signal is left on after a turn or when the turn signal prematurely turns off.

Spoke-mounted turn signal activation switches, such as those envisioned in U.S. Pat. No. 5,823,666 to Kingsolver, do not eliminate the requirement that a driver's hand must be repositioned to activate the switch even if the hand remains in contact with the steering wheel. The natural position of the driver's thumb is aligned with the rim of the steering wheel or wrapped partially around the rim of the steering wheel when the wheel is gripped. Therefore, a driver must release his/her grip from the steering wheel in order to re-position the thumb on the spoke mounted switch. This change in position is necessary regardless of the location of the spoke around the internal diameter of the steering wheel. If the driver's hand is located proximal to or in contact with the spoke and above the spoke, the driver must rotate the hand downward to contact the spoke-mounted switch. If the driver's hand is located proximal to or in contact with the spoke and below the spoke, the driver must either rotate the hand downward to contact the spoke-mounted switch or move the hand upward and rotate the thumb downward to make contact with the switch. Such a rotation or movement requires that the driver release his/her grip from the wheel in order to move the hand.

Even though the expressed advantage of placing the turn signal switch in the spoke of the steering wheel was that it would permit turn signal operation without the driver needing to remove his/her hands from the steering wheel, in practice a driver must re-position his/her hands to press the spoke-mounted switches. As addressed above, such a design, like those placing the turn signal activation switch in the steering wheel hub, permits the operation of the switch without removing one hand from the steering wheel in very limited and still undesirable positions of the hand relative to the steering wheel.

In U.S. Pat. No. 6,961,644 to Mercier et al., a steering wheel with hot buttons placed at the "10 o'clock" and "2 o'clock" positions on the steering wheel rim was posited.

According to this publication, such a system would allow a driver to activate the hot buttons, thus activating a turn signal, by using a thumb. Such a process of activating a turn signal, according to this publication, would not require a driver "to even move his or her hands much." However, tests conducted demonstrated that the hot buttons of this hypothetical device cannot be pressed if the driver maintains a fully-wrapped four finger grip anywhere on the top half of the steering wheel. Therefore, this hypothetical device suffers from all of the problems of other earlier devices because it merely relocates the functionality of the turn signal stalk switch to hot buttons on the rim of the steering wheel. Turn signals may be inadvertently turned on by misplacement of the hand or remain on with the signal lights "blinking" well after a turn is completed. Turn signal lights may turn off prematurely if the steering wheel is momentarily turned even slightly away from the direction of the turn. Furthermore, with this hypothetical device the driver must loosen his or her grip on the steering wheel so that the hand may be rotated in order to put the thumb in position to operate the hot buttons.

According to "Hands-On: A Practical Measure of the Perceived Risk of the Driving Context," J. A. Thomas and D. Walton, Transit NZIHT $7^{th}$ Annual Conference (2005), most drivers place both hands somewhere on the top half of the steering wheel when driving under higher-risk or complex conditions. It follows then that most drivers feel that driving with two hands on the top half of the steering wheel, particularly during high-risk or complex driving situations, provides more control over the vehicle. As Paul A. Eisenstein noted in "Turn signal neglect a real danger, study shows," citing research by the Society of Automotive Engineers, "drivers either neglect to use their signals when changing lanes—or fail to turn the signals off—48% of the time." http://bottomline.msnbc.msn.com/_news/2012/05/01/11486051-turn-signal-neglect-a-real-danger-study-shows?lite. Eisenstein further notes, "when making a turn the failure rate is around 25%." Id.

A driver in many instances must remove one hand from the steering wheel in order to operate a stalk switch-activated turn signal because the stalk switch is typically not located in close enough proximity to the steering wheel. Regardless of the driver's hand position, one hand must always be removed from the steering wheel in order to operate a stalk switch-activated turn signal. Where the turn signal switches are located in the hub of the wheel, the result is essentially the same. Either the driver's hand must be removed from the steering wheel to activate the hub-mounted switch or the hand must be turned so that the thumb of the driver's hand can reach the hub-mounted switch. In turning the hand to stretch the thumb to reach the switch, a driver must release his/her grip on the steering wheel, even if the hand remains in contact with the steering wheel. Similarly, when the turn signal switch is located in a spoke of the steering wheel, the driver must reposition his or her hand in order to operate the spoke-mounted switch.

It would therefore be advantageous to have a turn signal activation switch and system which does not require that a driver release his/her grip from the steering wheel in order to operate the switch. It would be a further advantage to have a turn signal activation switch and system which can be operated during high-risk or complex driving situations while maintaining a two-handed grip on the steering wheel. It would be an additional advantage to have a turn signal activation switch and system that would not prematurely turn off or remain on after a turn. It would be yet a further advantage to have a turn signal activation switch and system that could not be accidently operated.

Computer-driver interfaces ("CDI") are also known for use on motor vehicles. Such interfaces may be used to control specific equipment components of the motor vehicle such as a radio, compact disc player, connected devices, or wireless communication devices. Interfaces such as the BMW IDRIVE system, AUDI MMI, system, MERCEDES COMMAND system, LEXUS REMOTE TOUCH system, FORD SYNC system and MYFORD TOUCH system, each offer variations on the same type of controls. Such CDIs appear to be mouse/dial/joystick/touch screen combinations with the controls located in the proximate to a gear shift selector. Alternatively, such CDIs may be located on stalk levers with buttons and switches attached, or in thumb-operated buttons located on the steering wheel horizontal spoke cross bar directly inwards from the steering wheel annular ring and proximal to the 3 o'clock and 9 o'clock positions on the annular ring. Information from such a computer system which controls the motor vehicle equipment components may be displayed to the motor vehicle operator via a screen in the center of the vehicle dashboard, on a screen in the vehicle operator's instrument cluster, and/or in a heads-up-display also known as a HUD.

The CDIs typically cannot be operated with the motor vehicle operator maintaining a fully wrapped grip around the annular ring of the steering wheel, and would require repositioning of the hands especially if the hands were originally positioned on the upper half of the steering wheel. Some of the presently commercially available CDIs have been criticized because their use requires a driver to look away from the road in order to locate and operate the interface.

It would therefore be advantageous to have a CDI and system which does not require that a driver release his/her grip from the steering wheel in order to operate the interface. It would be a further advantage to have a computer-driver interface and system which can be operated during high-risk or complex driving situations while maintaining a two-handed grip on the steering wheel. It would be an additional advantage to have a computer-driver interface and system that could not be accidentally operated.

Common to many personal digital assistants ("PDA") and cellular telephones are assignable keys that may also be referred to as "convenience keys." Convenience keys allow an operator to designate a specific function (camera, voice recorder, media player, etc.) on the PDA or cellular telephone. Many video game systems such as XBOX game system or PLAYSTATION game system, or personal computers as well as personal music devices such as an IPOD device include a menu which offers a subsection of controller where the operator may deviate from the native default settings of the device and assign specific functions to specific keys on the device. Personalized keys are also known for seat, steering wheel, mirrors and seat belt location settings and are found in many motor vehicles with control buttons usually on the door of the motor vehicle. Such personalized keys are analogous to radio presets and allow a driver to adjust selected elements to a pre-set value with the push of one button. It appears, however, that assignable/reassignable convenience keys are not available as integrated controls in the steering wheel of a motor vehicle.

It would therefore be advantageous to have a CDI and system which includes assignable/reassignable convenience keys that are integrated into the annular ring of a motor vehicle steering wheel so that an operator sitting behind the steering wheel would have the ability to assign a function to such convenience keys, and then have the option to change that function to a different function at will.

It appears that the operation of all paddle/thumb shifters ("PS") on motor vehicles in the consumer marketplace require a driver of such motor vehicles to loosen or alter their fully wrapped four finger grip on the steering wheel of the motor vehicle. Many such paddles are especially used in sporty driving situations. It is reasonable to assume that the vehicle driver's underlying desire in those circumstances is to maintain as much control over the steering wheel as possible. PS can be found dating back to at least 1912 and evolved in the consumer market to apparently mimic the FORMULA ONE automobile paddles which achieved racing success in the late 1980's. Today, most automobile manufacturers offers some variety of PS in at least one model of motor vehicle. It appears such PS have been marketed as a compromise, on the one hand, for car buyers who wanted access to both manual and automatic shifting of the motor vehicle's transmission's gears, and, on the other hand, as a faster shifting improvement over traditional manual transmissions on automobiles such as the FERRARI automobile.

It would therefore be advantageous to have PS for a motor vehicle integrated into the annular ring of the motor vehicle's steering wheel such that the driver of the motor vehicle would not have to loosen or alter a fully-wrapped four-finger grip on the steering wheel in order to operate the paddle shifters. It would be a further advantage to provide an integrated vehicle control system ("IVCS") and apparatus which includes a CDI and system having assignable/reassignable convenience keys that are integrated into the annular ring of a motor vehicle steering wheel so that an operator could assign the paddle-shifter functionality to the convenience keys at will.

The advent of "hands free" controls in a vehicle has been primarily in response to the desire to keep a driver's hands on the wheel, not necessarily because drivers want to "speak" every command to operate the motor vehicle. There are many commands that drivers would prefer to keep secret. In the event of a carjacking or kidnapping, providing the driver with the ability to covertly send a distress call to 911 while appearing to simply drive the car with two hands on the wheel is a feature never before offered in the marketplace.

It would therefore be an advantage to have an IVCS which can be operated during high-risk or complex driving situations while maintaining a two-handed grip on the steering wheel and facilitates the sending of a distress call to emergency personnel. In vehicles equipped with GPS systems, the distress call could also send emergency personnel a real-time location and potentially also activate a hidden camera in the car capturing a picture or video image. Cab drivers or bus drivers would no longer have to risk reaching for the radio or a "bank teller style" hidden button to call for help if an IVCS were available which did not require a motor vehicle operator to remove his or her hands from the motor vehicle's steering wheel in order to operate.

It would also be an advantage to have a CDI and system which does not require that a driver release his/her grip from the steering wheel in order to operate the interface and which is further integrated with a motor vehicle's HUD system. It would be advantageous for a driver to be able to access a HUD system to obtain information such as the motor vehicle's speed, navigation information and location proximity alerts, or to access a vehicle's night vision capabilities, while allowing the driver to keep his or her eyes on the road while maintaining a fully-wrapped four-fingered grip on the motor vehicle's steering wheel.

It would furthermore be advantageous to have a turn signal activation switch and system which does not require that a driver release his/her hands from the steering wheel in order to operate the switch. It would be an additional advantage to have a switch and system which can be set in an autonomous mode which permits a driver to engage a switch and subsequently remove their thumb from the switch while leaving the switch engaged and corresponding exterior signal light flashing. It would be yet a further advantage to have a turn signal switch and system that self-cancels an autonomously engaged switch and corresponding exterior light after a lane change or turn has been detected.

SUMMARY OF THE INVENTION

The present invention provides an activation switch and system which is integral to the rim of a steering wheel and may be operated without the need for a driver to change his/her grip on the steering wheel. The present invention more specifically provides a motor vehicle PS system which permits shifting the motor vehicle's transmission while maintaining a two-handed four-fingered grip on the steering wheel during high-risk or complex driving situations. In a preferred embodiment, the present invention provides an integrated motor vehicle PS system for use with a motor vehicle steering wheel having an annular ring. The integrated motor vehicle PS system includes a left actuator, the left actuator attached to the steering wheel annular ring between the 9 o'clock and 12 o'clock positions on the annular ring; a right actuator, the right actuator attached to the steering wheel annular ring between the 3 o'clock and 12 o'clock positions on the annular ring; and a controller, the controller connected to the left and right actuators, the controller further connected to a system controller which causes the motor vehicle's transmission to shift gears. The left actuator and the right actuator of this embodiment do not overlap. Furthermore, the controller activates the left actuator and the right actuator when the left and the right actuators are depressed simultaneously and held for a pre-set threshold time, thus providing an activated left actuator and an activated right actuator. In accordance with the present invention, the transmission is shifted up and down through its gears when one of the left and right actuators is depressed. The integrated motor vehicle PS system of the present invention can cause the transmission to shift into the neutral position when the activated left and right actuators are simultaneously depressed. The integrated motor vehicle PS system can cause the transmission to shift into the park position when the activated left and right actuators are simultaneously depressed and the motor vehicle is not moving.

In still further embodiments of the present invention, each of the left and right actuators may include an array of switches such that the array of switches may be depressed in multiple locations using multiple positions of the hand. In one embodiment, the controller determines when a thumb-sized pattern of switches in a switch array is depressed. If a thumb-sized pattern of switches has been depressed, then the controller will recognize the corresponding actuator as being in the "on" position. In still further embodiments, an audible signal may be emitted and/or a dash light turned on when an activated actuator is depressed.

The present invention also provides an integrated motor vehicle equipment component control system ("ECCS") for use with a motor vehicle steering wheel having an annular ring and a motor vehicle equipment component having a function. The integrated motor vehicle ECCS comprises a left actuator, the left actuator attached to the steering wheel annular ring between the 9 o'clock and 12 o'clock positions on the annular ring; a right actuator, the right actuator attached to the steering wheel annular ring between the 3 o'clock and 12 o'clock positions on the annular ring; and a controller, the controller connected to the left and right actuators, the controller further connected to a motor vehicle component such as radio, compact disc player, connected device, cellular telephone and navigation system, and other components. The left actuator and the right actuator do not overlap and the controller activates the left actuator and the right actuator when the left and the right actuators are depressed simultaneously and held for a pre-set threshold time. The function of the motor vehicle equipment component is activated when an actuator is depressed, the actuator selected from the group consisting of the left actuator and the right actuator.

The integrated motor vehicle ECCS of the present invention may further include actuators, the actuators each including a switch array.

The present invention also provides an integrated motor vehicle ECCS having a controller that activates left and right actuators when thumb-sized patterns of switches in a switch array located in of each of the left and the right actuators are simultaneously depressed.

The present invention still further provides an integrated motor vehicle ECCS for a motor vehicle having a steering wheel and having a left and right actuator such that the left actuator is preferably positioned beginning at the 11 o'clock position on the steering wheel annular ring and preferably extends in a two inch arc towards the 9 o'clock position and such that the right actuator is preferably positioned beginning at the 1 o'clock position on the steering wheel annular ring and preferably extends in a two inch arc towards the 3 o'clock position.

The present invention also provides an integrated motor vehicle ECCS having a left and right actuator such that the left and/or right actuators causes the controller to control a motor vehicle equipment component or, optionally, the controller sends a signal to an interface controller which controls a motor vehicle equipment component and wherein the motor vehicle equipment component could be one or more of a sound system, an entertainment system, a radio, a compact disc player, a connected device, a cellular telephone, a navigation system, an internet access system, BLUETOOTH system, and other motor vehicle components.

The present invention provides a turn signal activation switch and system ("TSSS") which is integral to the rim of the steering wheel and may be operated with the thumbs and may be further operated without the need of a driver to change his/her grip on the steering wheel. The present invention more specifically provides a TSSS which permits a driver to both manually engage and autonomously engage a turn signal actuator and corresponding exterior signal light. The present invention further provides a system which enables a driver to manually disengage an autonomously engaged or manually engaged turn signal actuator and corresponding exterior signal light. The present invention further provides multiple systems for self-canceling or disengaging an autonomously engaged turn signal actuator and corresponding exterior signal light. The multiple systems provided in the present invention provide methods for canceling or disengaging an autonomously engaged turn signal actuator based on information communicated via "Lane Detection" type systems and Steering Wheel Angle and Rotation Sensor type systems among other similar systems that are capable of determining a vehicle's lane position, driving path and steering wheel position.

BRIEF DESCRIPTION OF THE DRAWINGS

FIG. 8d is still a further illustration of a driver gripping the prior art steering wheel of FIG. 7 illustrating the position of the driver's hand relative to steering wheel-mounted turn signal switches.

FIG. 9a illustrates a driver gripping the steering wheel of the present invention while maintaining a four-fingered grip and activating the actuator.

FIG. 9b illustrates a driver gripping a steering wheel of the present invention in a four-fingered grip.

FIG. 9c illustrates another view of a driver gripping the steering wheel of the present invention in a four-fingered grip.

FIG. 9d illustrates a driver gripping the steering wheel of the present invention while maintaining a four-fingered grip and activating the actuator.

FIG. 13 is a diagram of an embodiment of the system of the present invention showing a steering wheel, controller, and motor vehicle transmission.

DETAILED DESCRIPTION OF THE INVENTION

Figure 1A:
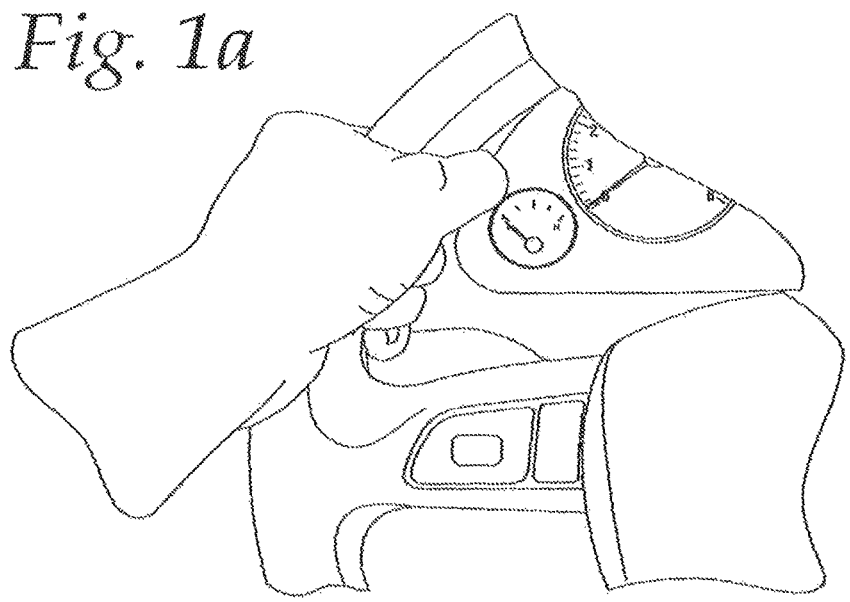
FIG. 1a is an illustration of a driver's hand gripping a steering wheel in a four-fingered grip.
Figure 1B:
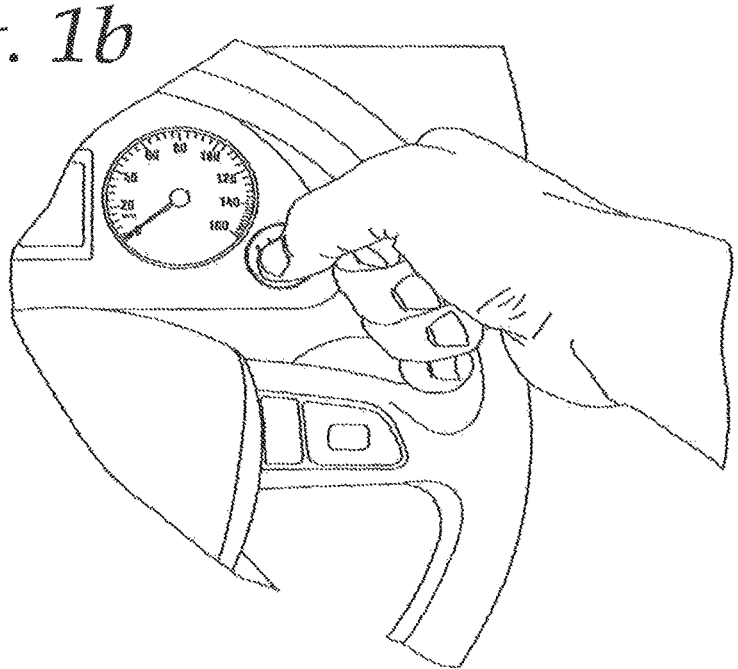
FIG. 1b is a further illustration of a driver's hand gripping a steering wheel in a four-fingered grip.

It is generally desirable, if not advisable, for a driver to grip a steering wheel of a motor vehicle in a four-fingered grip with the fingers of the hand wrapped around the rim of the steering wheel when driving the motor vehicle. The four-fingered grip is illustrated in FIGS. 1a and 1b. Such a four-fingered grip securely positions the steering wheel in a driver's hands. Embodiments of the present invention are directed towards allowing a driver to maintain a four-fingered grip on the steering wheel while operating the vehicle's turn signals or other mechanical components of the motor vehicle via a computer-driver interface, such components including a radio, a compact disc player, a cellular telephone, a navigation system, an internet access system, BLUETOOTH system, and other motor vehicle components.

Figure 2:
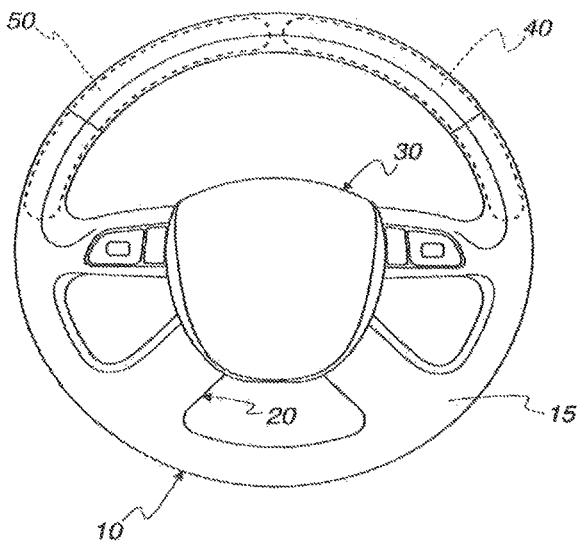
FIG. 2 is an illustration of a steering wheel of an embodiment of the present invention.

In one embodiment, the present invention provides a system which permits the controlled operation of a motor vehicle's turn signals without a driver being required to loosen or remove a fully-wrapped four-fingered grip on the steering wheel. As addressed more fully below, other embodiments provide a CDI which facilitates operation of a motor vehicle's equipment components and mechanical functions and which may be programmed as to which functions are operated. The system of the embodiments of the present invention, referring now to FIG. 2, would include switches, sensors or gages, collectively actuators, integrally mounted to a steering wheel 10. As shown in FIG. 2, actuators 40, 50 may be proximal to each other, but actuators 40, 50 do not overlap. The steering wheel 10 of the present embodiment includes an annular ring 15 which may be connected to a hub 30 by one or more spokes 20. Other configurations of a steering wheel will be known to those of ordinary skill in the art.

Figure 3:
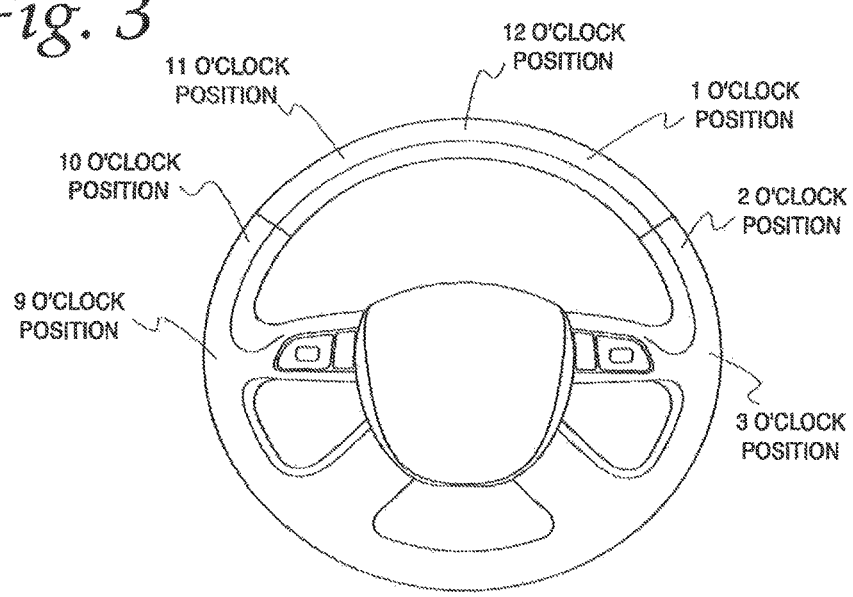
FIG. 3 is an illustration of the clock positions designating locations on a steering wheel.

Referring now to FIG. 3, the upper half of annular ring 15 of steering wheel 10 may be designated by the clock positions from 3 o'clock on the right-hand side of steering wheel 10 through 9 o'clock on the left-hand side of steering wheel 10. As also shown in FIG. 2, actuator 40 may be positioned to cover a portion of steering wheel 10 between the 3 o'clock position and the 12 o'clock position. Similarly, actuator 50 may be positioned to cover a portion of steering wheel 10 between the 9 o'clock position and the 12 o'clock position. When actuators 40, 50 are so positioned they may abut, but do not overlap. Accordingly, in one embodiment the left actuator is positioned proximal to the 9 o'clock position on the steering wheel annular ring and the opposite end of the left actuator is positioned proximal to the 12 o'clock position on the steering wheel annular ring, such that the left actuator is sized to span the distance between the 9 o'clock and 12 o'clock positions. A standard-sized steering wheel has a diameter of approximately 15 inches. Therefore the circumferential segment of annular ring 15, or the "arc-segment-length," from the 3 o'clock position to the 12 o'clock position has a length of about 12 inches. Similarly, the arc-segment-length from the 9 o'clock position to the 12 o'clock position also has a length of about 12 inches.

Figure 4:
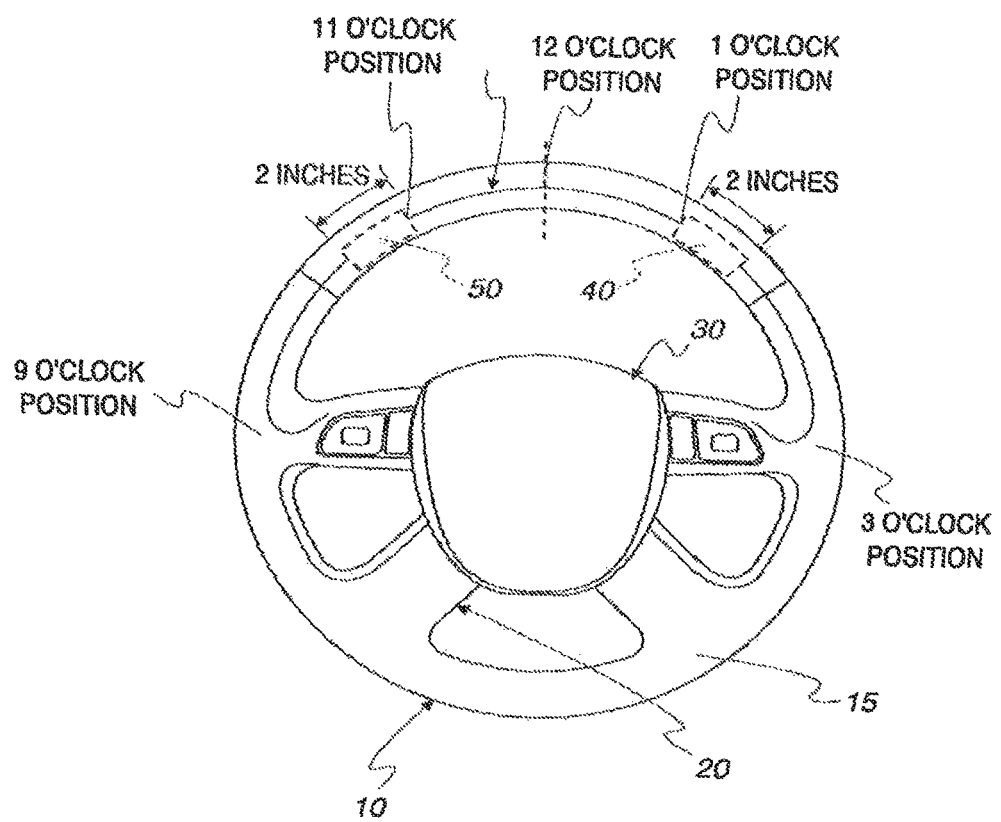
FIG. 4 is an illustration of a steering wheel of an embodiment of the present invention showing a preferred actuator location.

Actuators 40, 50 may be sized to cover the entire arc-segment-length between the 3 o'clock and 12 o'clock positions and the 9 o'clock and 12 o'clock positions, respectively, as described above. Alternatively, actuators 40, 50 may be sized to cover only a portion of the arc-segment-length between the 3 o'clock and 12 o'clock positions and the 9 o'clock and 12 o'clock positions, respectively. As shown in FIG. 4, one preferred size and location for actuators 40, 50 is an arc-segment-length of 2 inches with actuators 40, 50 covering a portion of annular ring 15 of steering wheel 10 ending at about the 1 o'clock and 11 o'clock positions respectively such that actuator 50 extends counterclockwise towards the 9 o'clock position and actuator 40 extends clockwise towards the 3 o'clock position.

Figure 5:
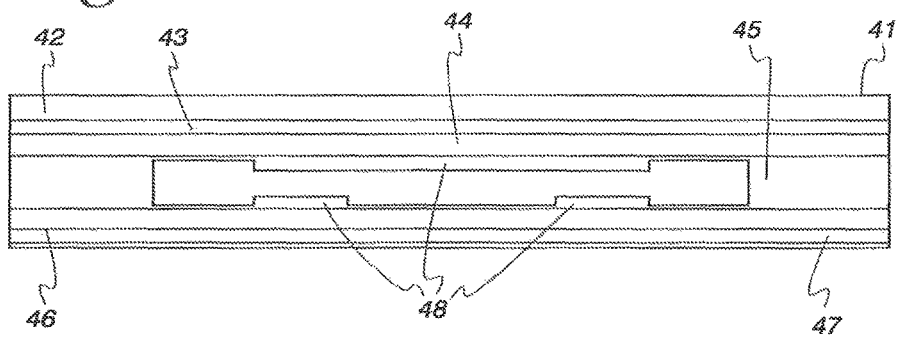
FIG. 5 is an illustration of one preferred actuator design of the present invention.

Actuators 40, 50 of the present invention may be membrane switches of a type manufactured by Tapecon, Inc., Tapecon Membrane Switch Division, Rochester, N.Y. Membrane switches, as is known in the art, may be manufactured in variety of configurations each of which are single pole, single throw switches which are normally open. Membrane switch configurations include a standard membrane switch construction, a tactile plastic dome construction and a stainless steel dome construction. FIG. 5 illustrates one type of membrane switch 41 which includes top overlay 42, adhesive layer 43, top circuit 44, circuit spacer 45, bottom circuit 46, bottom overlay 47 and contacts 48. Membrane switch 41 is normally open. When top overlay 42 is depressed, top circuit 44 is flexed so that a circuit is completed at contacts 48. Depending on the arc-segment-length, as described above, actuators 40, 50 may each include one or more membrane switches. Membrane switch arrays, which cover a larger area than a single membrane switch, are taught, for example, in WO1995001302, titled "Curve-conforming Sensor Array Pad." Actuators 40, 50 may be a fiber optic pressure sensor, or an array of fiber optic pressure sensors, of the type manufactured by Luna Innovations, Blacksburg, Va. Alternatively, actuators 40, 50 may be a large-area flexible pressure sensor matrix of the type developed by the Quantum-Phase Electronics Center, School of Engineering, University of Tokyo, Tokyo, Japan and described in "A Large-Area, Flexible Pressure Sensor Matrix With Organic Field-Effect Transistors For Artificial Skin Applications," T. Someya et al., PNAS, vol. 101, no. 27, Jul. 6, 2004. Furthermore, actuators 40, 50 may be a flexible strain gage of a type available from Omega Engineering, Inc., Stamford, Conn.

The actuators 40, 50 may be mechanically bonded to the steering wheel, such as by thermal or sonic welding if the materials of construction of the actuators 40, 50 and the steering wheel 10 are compatible and susceptible to such attachment. The actuators 40, 50 may be attached to the steering wheel 10 using an adhesive. The actuators 40, 50 when attached to the steering wheel 10 may be covered by a cover or skin (not shown) so that the actuators 40, 50 reside under the skin of the steering wheel 10. Actuators 40, 50 can be positioned under the skin of the steering wheel 10 so as to make the actuators 40, 50 undetectable by the human eye. The actuators 40, 50 may be molded into the steering wheel 10 during the process of manufacturing the steering wheel 10. When molded into the steering wheel 10, the actuators may be positioned under the surface of the steering wheel 10 if the material of construction of the steering wheel 10 is sufficiently deformable to permit deforming the steering wheel 10 in a manner that also allows activating the actuators 40, 50.

The properties of the material of construction of a steering wheel 10 will be known to those of ordinary skill in the art such that the permissible methods for attachment of actuators 40, 50 to the steering wheel 10 will be also be understood. For example, it is known in the art that steering wheels may be molded from a pliable cross-linked vinyl chloride polymer as taught in U.S. Pat. No. 4,567,217 to Yamazaki et al. It is further understood in the art that flexible sensors, such as membrane switches, may be encapsulated in a molded part as taught in U.S. Pat. No. 5,762,853 to Harris et al. Also, insert molded membrane switches have been used as steering wheel hub-mounted horn switches as taught in U.S. Pat. No. 5,198,629 to Hayashi et al.

Figure 6:
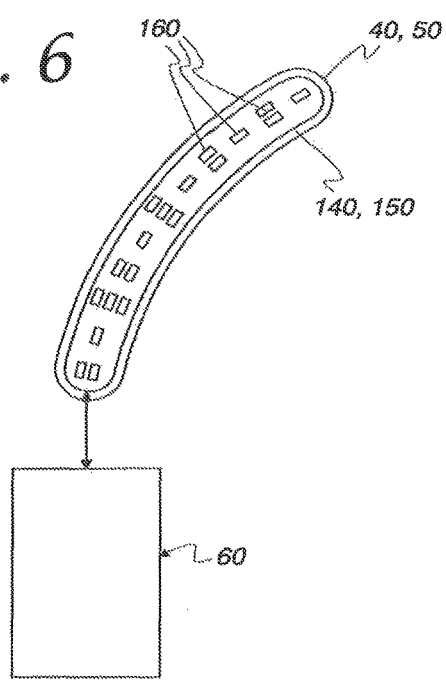
FIG. 6 is an illustration of an embodiment of the present invention in which an actuator includes a plurality of switches in a switch array.

To accommodate different hand positions used by a driver during operation of a vehicle, actuators 40, 50 may be configured to sense when the thumb of a hand is pressing one or both of the actuators 40, 50. FIG. 6 illustrates one design in which each of actuators 40, 50 are made up of switch arrays 140, 150, respectively, and where the switch arrays 140, 150 each include a plurality of switches 160. The switch array 140, 150 of FIG. 6 is merely illustrative and does not depict a necessary configuration of switches 160. The switches 160 are normally open (off), closed when depressed or selected (on), and return to open (off) when deselected. Each of switches 160 is connected to a controller 60 so that controller 60 may sense when a switch 160 is in the open position or the closed position. Switches 160 may be connected to controller 60 via a wiring harness (not shown) for example, such that each switch 160 is wired to a terminal block (not shown) and the terminal block is wired to the controller 60 via the wiring harness. Those of ordinary skill in the art will recognize other connection means for wiring switches 160 to controller 60. The activation state of each switch 160 in switch arrays 140, 150, that is to say whether a switch 160 is on or off, may be determined by the controller 60. In a typical operation, a switch 160 opens and closes an electrical circuit between the switch 160 and the controller 60. If only switches 160 corresponding to a thumb-sized pattern are depressed, then the actuators 40, 50 will be recognized as being in the "on" position by the controller 60. However, if switches 160 corresponding to a pattern larger than a thumb are depressed, then actuators 40, 50 will be recognized as being in the "off" position.

In the embodiments of the present invention which incorporate actuators 40, 50 as illustrated in FIG. 6, the controller 60 is programmed to determine when switches 160 are depressed in a thumb-sized pattern. As used herein, a thumb-sized pattern means an area that ranges from about 0.5 square inches to about 2.25 square inches. Thus, if a full four-fingered grip is taken of steering wheel 10 a pattern of switches 160 may be depressed, depending on where the driver places his or her hand on the steering wheel, which exceeds the size of the pattern of switches made when a thumb depresses one of actuators 40, 50. Under this condition, controller 60 does not activate actuators 40, 50 and controller 60 recognizes actuators 40, 50 as being in the "off" position. However, if a thumb is then placed on either actuator 40 or actuator 50, controller 60 registers that a thumb-sized pattern of switches has been depressed and controller 60 recognizes either actuator 40 or actuator 50, respectively, as being in the "on" position. Once actuators 40, 50 are activated via controller 60, either actuator 40 or actuator 50 may be depressed to turn on the corresponding signal lights (not shown) or operate the corresponding vehicle equipment component or function, such as a radio, compact disc player, cellular telephone or navigation system (not shown). Once activated, simultaneously pressing actuator 40 and actuator 50 will not turn on the corresponding turn signal lights. If controller 60 has not activated actuators 40, 50, then depressing either actuator 40 or actuator 50 will not turn on the corresponding turn signal lights or operate the corresponding vehicle function. It will be understood by those of ordinary skill in the art that a motor vehicle equipment component will have at least one function, being turned on/off for example, but may also have a plurality of functions.

In one embodiment, pressing an activated actuator 40 or an activated actuator 50 will turn on an audible signal in addition to turning on the corresponding turn signal lights or equipment component. The audible signal may serve to indicate to the driver that the turn signal has been turned on. The audible signal may also serve to indicate that the actuators 40, 50 have become activated. In one embodiment, the audible signal may emanate from the speaker system of the motor vehicle that is used, for example, to signal that a car door is open when the ignition key remains in the ignition switch. In another embodiment, the audible signal may emanate from the same sound source used to alert a driver of the motor vehicle that the stalk-switch-operated turn signal has been turned on. In another embodiment, the audible signal may be wirelessly broadcast using BLUETOOTH technology such that the audible signal is received in an ear piece or headset worn by the driver and the driver thereby hears the audible signal. In yet another embodiment, actuators 40, 50 may be connected to corresponding turn signal indicator lights located in the dashboard of the motor vehicle such that pressing an activated actuator 40 or an activated actuator 50 will light the corresponding turn signal indicator lights. BLUETOOTH technology or, alternatively BLUETOOTH system refers to a proprietary open wireless technology standard for exchanging data over short distances (using short-wavelength radio transmissions in the ISM band from 2400-2480 MHz) from fixed and mobile devices, creating personal area networks with high levels of security. BLUETOOTH technology and systems are available from Bluetooth Sig, Inc., Lake Washington Boulevard, Kirkland, Wash.

Figure 7:
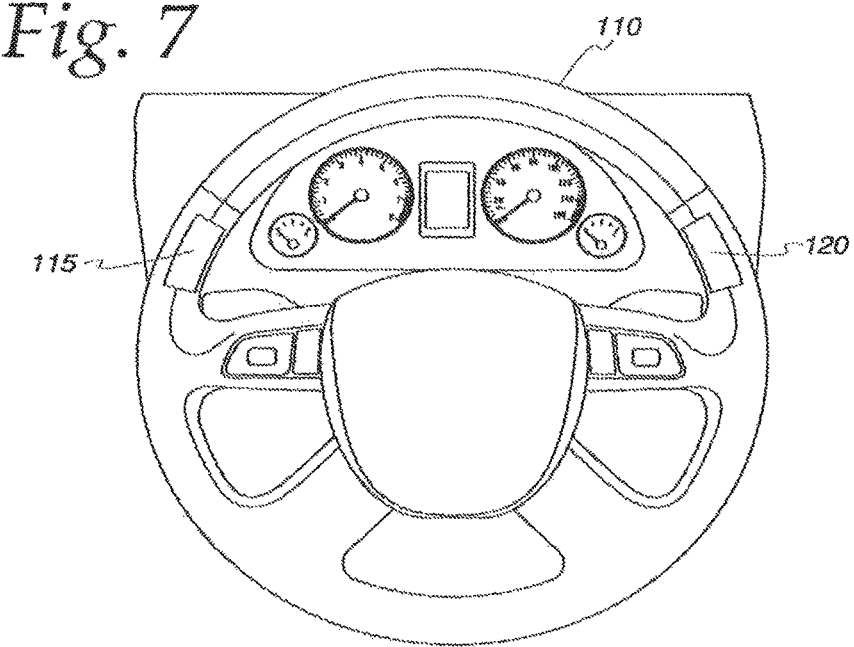
FIG. 7 is an illustration of a steering wheel of the prior art illustrating the position of the steering wheel-mounted turn signal switches.
Figure 8A:
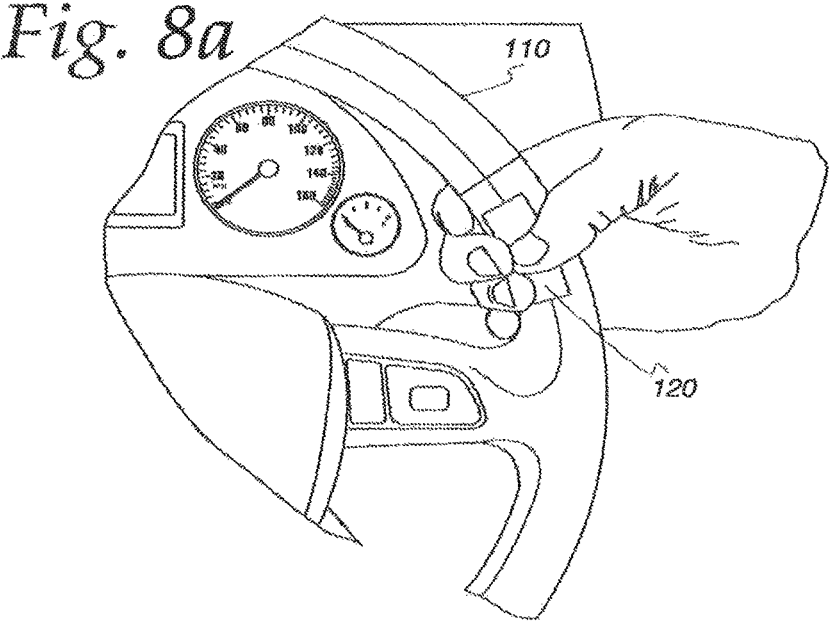
FIG. 8a is an illustration of a driver gripping the prior art steering wheel of FIG. 7 illustrating the position of the driver's hand relative to steering wheel-mounted turn signal switches.
Figure 8B:
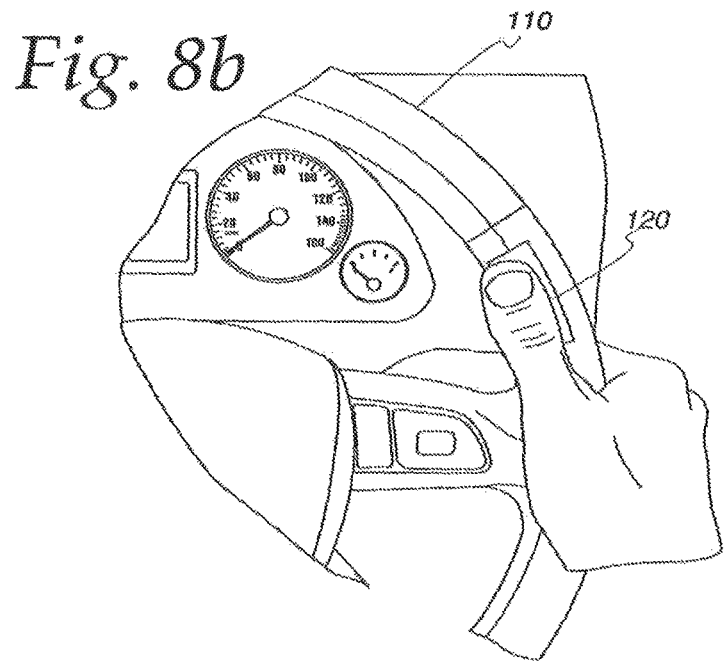
FIG. 8b is a further illustration of a driver gripping the prior art steering wheel of FIG. 7 illustrating the position of the driver's hand relative to steering wheel-mounted turn signal switches.
Figure 8C:
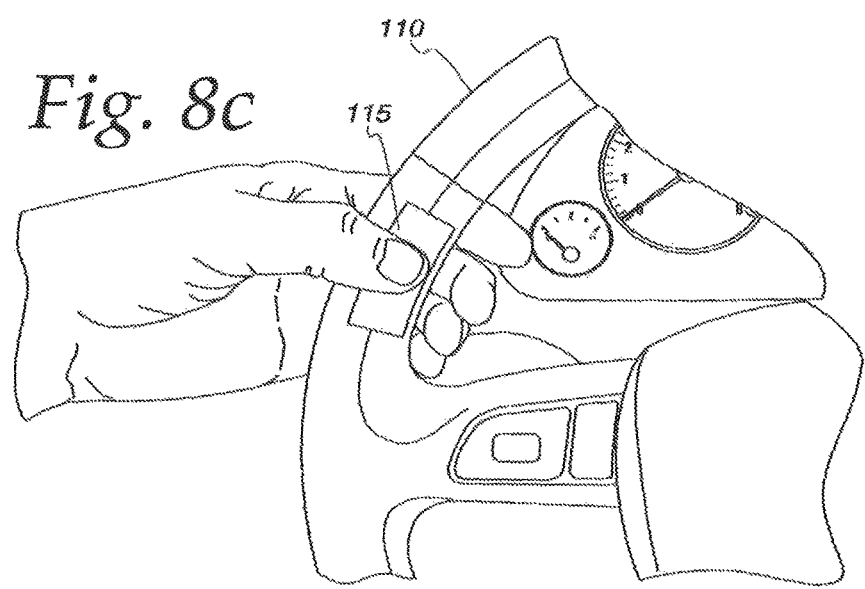
FIG. 8c is yet a further illustration of a driver gripping the prior art steering wheel of FIG. 7 illustrating the position of the driver's hand relative to steering wheel-mounted turn signal switches.

FIG. 7 illustrates a steering wheel 110 of the prior art and FIGS. 8a-8d illustrate a driver's hands gripping the steering wheel 110 of FIG. 7. In FIG. 7, hot buttons 115, 120 are depicted positioned on the steering wheel 110 as described in the prior art. As used herein, the term "hot button" refers to a single on/off switch which is pressed to turn on and pressed again to turn off. Thus, hot buttons 115, 120 are placed at the 10 o'clock and 2 o'clock positions on the steering wheel 110, respectively. Referring to FIG. 8a, it is clear that the four-fingered grip of the driver must be loosened, thus not fully gripping steering 110, in order to rotate the thumb into position to depress hot button 115. In FIG. 8b, the driver must again modify the four-fingered grip to accommodate the spoke 125 in order to access and depress hot button 115. In FIG. 8c, it is again clear that the four-fingered grip of the driver must be loosened, thus not fully gripping steering 110, in order to rotate the thumb into position to depress hot button 120. As was seen in FIG. 8b, FIG. 8d illustrates how the driver must modify the four-fingered grip to accommodate the spoke 125 in order to access and depress hot button 120.

In one embodiment, actuators 40, 50 are preferably positioned on annular ring 15 of steering wheel 10 facing the driver. When positioned in this location, actuators 40, 50 may be activated when the driver presses down on the steering wheel using a thumb of the driver's left or right hands. FIGS. 9a-9d illustrate a driver gripping annular ring 15 of steering wheel 10 with the driver's thumb position in a full four-fingered grip (FIGS. 9b and 9c) and with the thumb positioned over actuators 40, 50 (FIGS. 9a and 9d). It will be recognized by persons of ordinary skill in the art that actuators 40, 50 may be positioned in locations other than on the side of annular ring 15 directly facing the driver.

Figure 10:
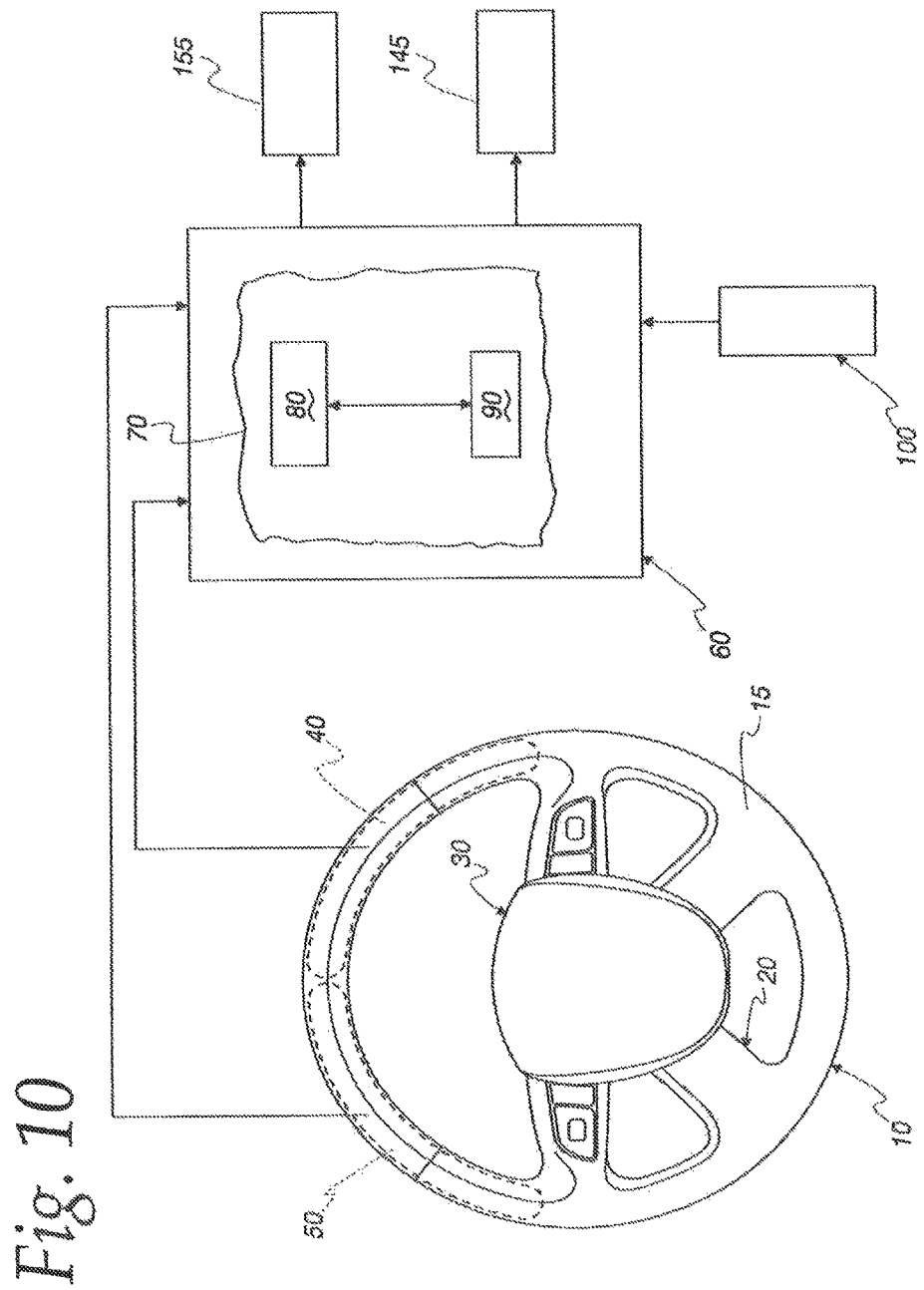
FIG. 10 is a diagram of an embodiment of the system of the present invention showing a steering wheel, controller, stalk switch and actuator circuits.

Referring now to FIG. 10 which illustrates an embodiment of the present invention, actuators 40, 50 are connected to controller 60. Controller 60 includes processor 70. Processor 70 includes logic circuits 80, timer 90 and memory 100. Controller 60 is connected to right-side signal circuit 145 and left-side signal circuit 155. Right-side signal circuit 145 includes right-side signal lights (not shown) and left-side signal circuit (155) includes left-side signal lights (not shown). Turn signal stalk switch (not shown) may also be connected to controller 60. Alternately, as further described herein below, actuators 40, 50 and controller 60 may be used with other motor vehicle equipment or systems to operate an equipment component or to allow actuators 40, 50 to function as thumb shifters.

In an embodiment of the present invention, controller 60 controls the operation of actuators 40, 50 such that when actuator 40 is depressed, right side signal lights (not shown) of right-side signal circuit 145 are energized and when actuator 50 is depressed, left-side signal lights (not shown) of left-side signal circuit 155) are energized. When energized, right-side signal lights and/or left-side signal lights (not shown) may "blink" as is common to all turn signals.

Figure 11:
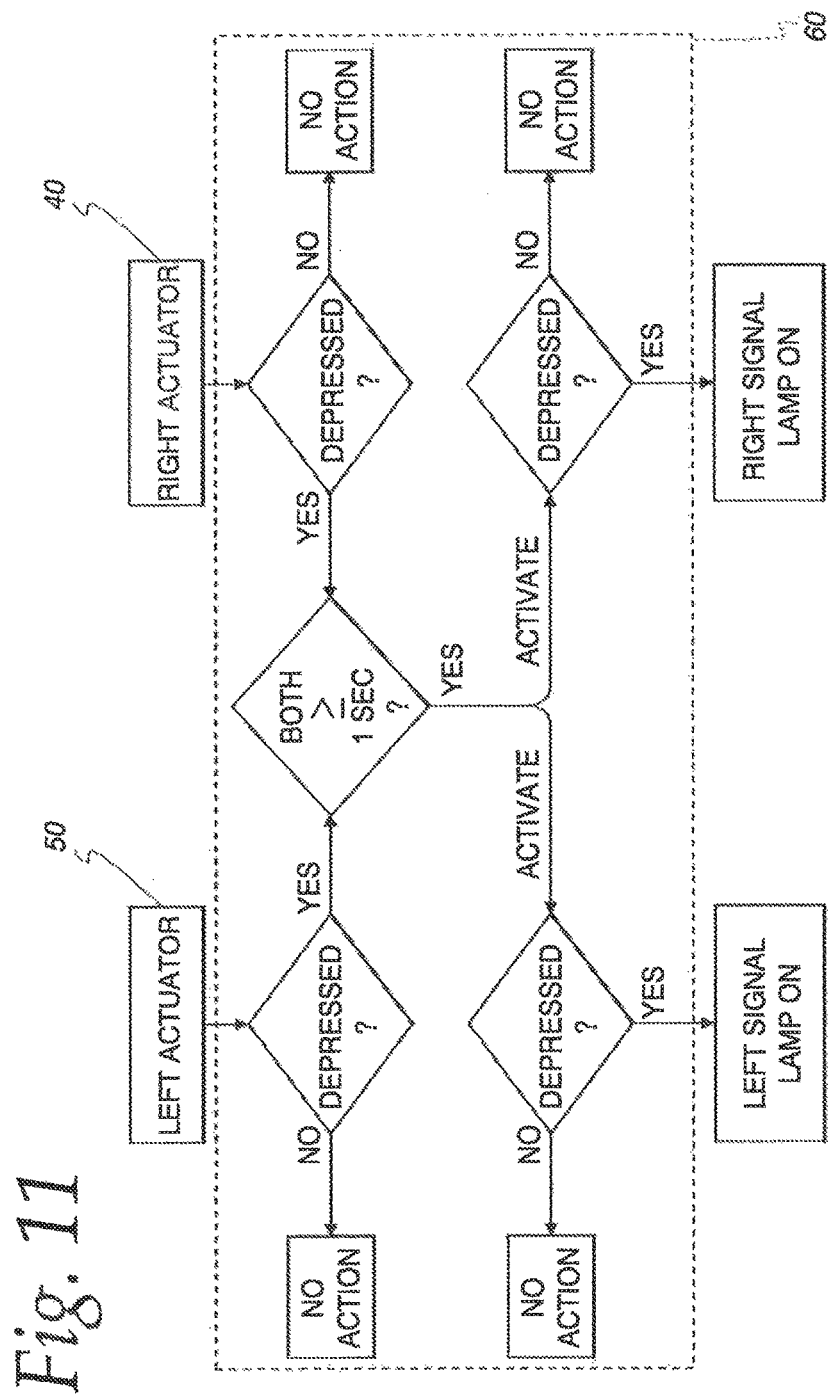
FIG. 11 is a logic diagram illustrating the operation of an embodiment of the present invention.

FIG. 11 illustrates the circuit logic of one embodiment of the present invention. In this embodiment, when actuator 40 is depressed it is in a closed position and it completes a circuit to controller 60. Similarly, when actuator 50 is depressed it completes a circuit to controller 60. If both actuator 40 and actuator 50 are depressed, controller 60 via timer 90 (shown in FIG. 10) measures the time each of actuator 40 and actuator 50 is depressed. If the measured time exceeds a pre-set threshold time, 1 second for example, then controller 60 activates actuators 40, 50. If the measured time is less than the pre-set threshold time, controller 60 does not activate actuators 40, 50. The pre-set threshold time can be varied and programmed into memory 100 shown in FIG. 10 such that logic circuits 80 of FIG. 10 in controller 60 activate actuators 40, 50. The pre-set threshold time may range from about 0.5 seconds to about 5 seconds. It is preferred that the pre-set threshold time be about 1 second. When activated, depressing actuator 40 results in the right side signal lights (not shown) of right-side signal circuit 145 to be energized and when actuator 50 is depressed left-side signal lights (not shown) of left-side signal circuit 155) are energized. When energized, right-side signal lamp and/or left-side signal lamp (not shown) may "blink" as is common to all turn signals.

Figure 12A:
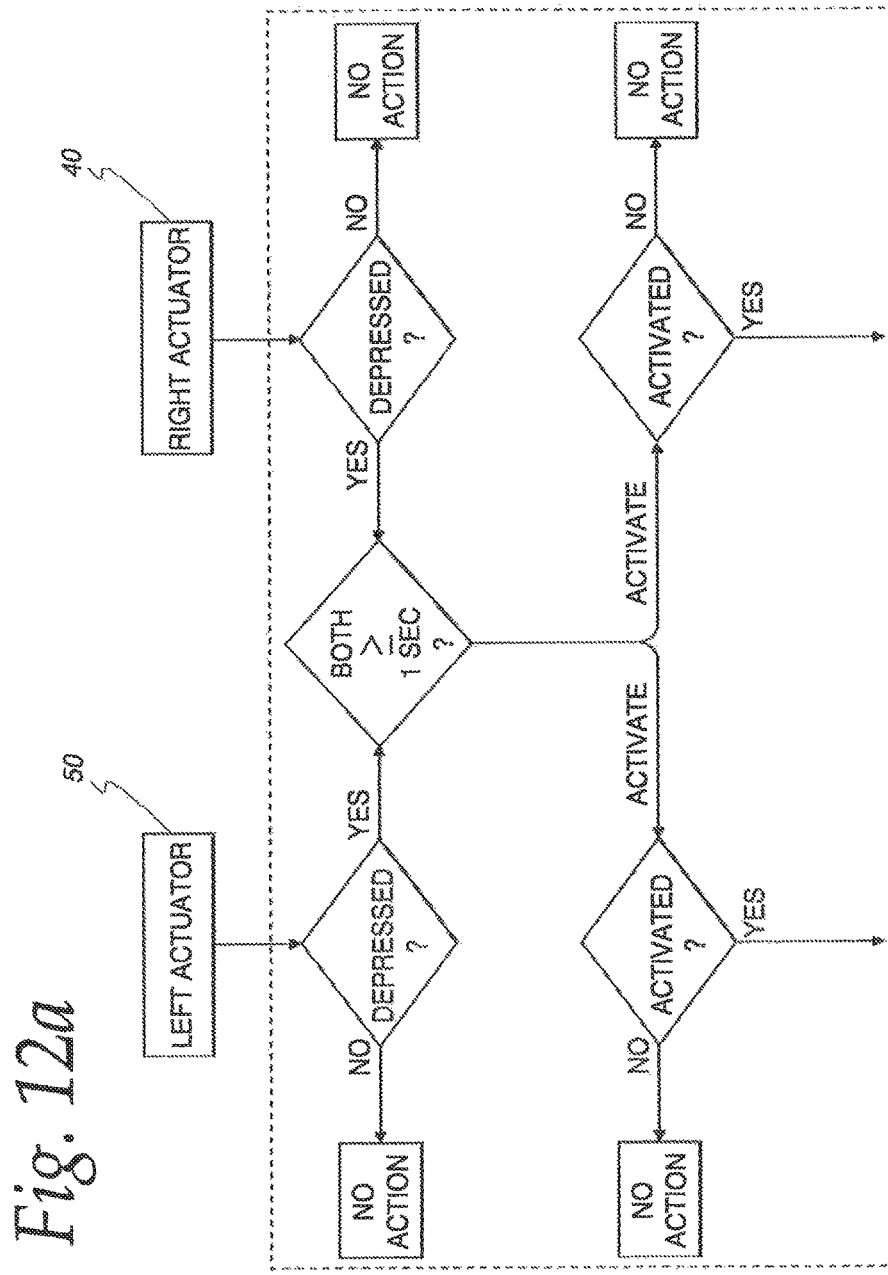
FIGS. 12a and 12b are a logic diagram illustrating the operation of an embodiment of the present invention in which a controller is used to determine when a thumb is pressing on a steering wheel to activate a turn signal.
Figure 12B:
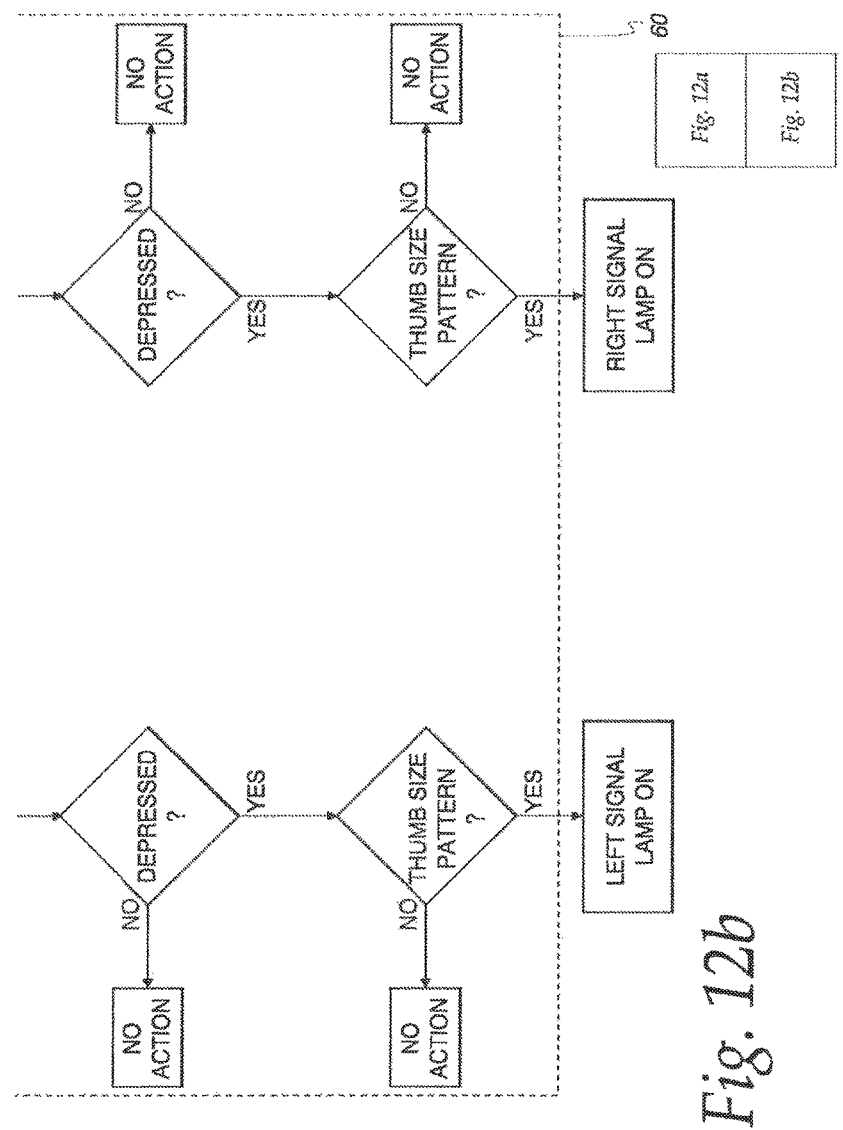

FIG. 12 (FIGS. 12a and 12b inclusive) illustrates the logic circuit of a further embodiment of the present invention in which actuators 40, 50 are of the type illustrated in FIG. 6. In this embodiment, actuator 40 and actuator 50 are each made up of switch arrays 140, 150, respectively, where each switch array 140, 150 includes a plurality of switches 160. The switches 160 are normally open (off), closed when depressed or selected (on), and return to open (off) when deselected. Each of switches 160 is connected to a controller 60 so that controller 60 may sense when a switch 160 is in the open position or the closed position. In a typical operation, a switch 160 opens and closes an electrical circuit between the switch 160 and the controller 60. If only switches 160 corresponding to a thumb pattern are depressed, then the actuators 40, 50 will be recognized as being "on" by the controller 60. However, if switches 160 corresponding to a pattern larger than a thumb-sized pattern are depressed, then actuators 40, 50 will be recognized as being "off." The controller 60 is programmed to determine when switches 160 are depressed in a thumb-sized pattern. Thus, if a full four-fingered grip is taken of steering wheel 10 a pattern of switches 160 may be depressed, depending on where the driver places his or her hand on the steering wheel, which exceeds the size of the thumb-sized pattern made when a thumb depresses actuators 40, 50. Under this condition, controller 60 does not activate actuators 40, 50 and controller 60 recognizes actuators 40, 50 as being in the "off" position. However, if a thumb is then placed on actuators 40, 50, controller 60 registers that a thumb-sized pattern of switches has been depressed and controller 60 will activate the actuators 40, 50 if they are depressed for at least the pre-set threshold time. When controller 60 activates actuators 40, 50, either one of actuator 40 or actuator 50 may be depressed to turn on the corresponding signal lights (not shown), or to operate a motor vehicle equipment component, as described herein below, or to operate as a thumb shifter, as also described herein below. If controller 60 has not activated actuators 40, 50, then depressing either of actuator 40 or actuator 50 will not turn on the corresponding signal lights, operate as an equipment component, or act as a thumb shifter.

To deactivate actuators 40, 50, both actuator 40 and actuator 50 are depressed simultaneously and held for a pre-set threshold time. Referring to FIG. 10, timer 90 of controller 60 measures the time each of actuator 40 and actuator 50 is depressed. If the measured time exceeds a pre-set threshold time, 1 second for example, then controller 60 deactivates the activated actuators 40, 50. If the measured time is less than the pre-set threshold time, controller 60 does not deactivate actuators 40, 50. The pre-set threshold time can be varied and programmed into memory 100 shown in FIG. 10 such that logic circuits 80 of FIG. 10 in controller 60 deactivate activated actuators 40, 50. It is preferred that the pre-set threshold time be about 1 second. When actuators 40, 50 are deactivated, depressing actuators 40, 50 will not turn on the corresponding turn signal lights, equipment component or function as paddle shifters.

When driving a motor vehicle equipped with a steering wheel that incorporates the present invention, a driver may use the vehicle's stalk switch to turn on the vehicle's turn signals. Preferably the operation of the stalk switch is not modified by incorporation of the present invention into the steering wheel, but modifications may be made without altering the concepts encompassed by the descriptions herein. The actuators 40, 50 may be used to turn on and turn off the turn signals of the motor vehicle once the controller 60 has activated actuators 40, 50 as provided herein. Thus, in a preferred embodiment, the actuators 40, 50 operate in parallel with the vehicle's stalk switch and the turn signals turn on when activated actuator 40 or activated actuator 50 is depressed and turn off when activated actuator 40 or, respectively, activated actuator 50 is released. Unlike the conventional stalk switch, which turns off when the steering wheel is rotated away from the direction of the turn, in the preferred embodiment of the present invention the turn signals only operate when one of actuator 40 and actuator 50 is depressed. In a critical or high-stress driving situation, a driver need only position his or her thumbs on the actuators 40, 50, depress both of the actuators 40, 50 and maintain them in an "on" position for a pre-determined amount of time, and thereafter operate the turn signals using only one of the actuators 40, 50. With the system and apparatus of the present invention, a turn signal cannot prematurely or accidently turn off. Once the actuators 40, 50 are activated, a turn signal is turned on by depressing one of actuators 40, 50 and it is turned off by releasing the depressed actuator.

In a further embodiment, which employs actuators 40 and 50 of the present invention as illustrated in FIG. 11, two activation settings for actuators 40 and 50 are possible: (1) actuators 40 and 50 require actuator activation upon each start up of the motor vehicle, or (2) actuators 40 and 50 are always activated when the engine of the motor vehicle is turned on after having once been activated. Controller 60 in this embodiment is a programmable controller or, alternatively, a computer-implemented device, which allows for the programming of actuators 40 and 50 with respect to their on/off status. Thus, if both actuator 40 and actuator 50 are depressed, controller 60 via timer 90 (shown in FIG. 10) measures the time each of actuator 40 and actuator 50 is depressed. Controller 60 may be pre-programmed with two threshold time ranges, for example a first threshold time range and a second threshold time range, such that simultaneously depressing actuators 40 and 50 for a time within the first threshold time range, for example 1 to 2 seconds, activates actuators 40 and 50 only for the period of time the engine of the motor vehicle is turned on. It should be noted that those of ordinary skill in the art will understand that the first threshold time range may be as short as a fraction of a second such that actuators 40, 50 are activated rapidly. Furthermore, those of ordinary skill in the art will understand that any threshold time range implemented with respect to embodiments of the present invention may be varied to suit specific needs and uses. In such instance, actuators 40 and 50 would need to be activated as described each time the motor vehicle is turned on. However, if actuators 40 and 50 are simultaneously depressed and held through the first threshold time range and for a duration within the second threshold time range, 3 to 5 seconds for example, actuators 40 and 50 are always on in that they are always activated when the engine of the motor vehicle is turned on. If the measured time is within either the first or second threshold time range, then controller 60 activates actuators 40, 50. If the measured time is less than the first threshold time range, controller 60 does not activate actuators 40, 50. The pre-set threshold time ranges can be varied and programmed into memory 100 shown in FIG. 10 such that logic circuits 80 of FIG. 10 in controller 60 activate actuators 40, 50. The pre-set threshold time ranges may range from about 0.5 seconds to about 5 seconds. It is preferred that the first pre-set threshold time range be about 1 to 2 seconds and that the second pre-set threshold time range be about 3 to 5 seconds. When activated, depressing actuator 40 results in the right side signal lights (not shown) of right-side signal circuit 145 to be energized and when actuator 50 is depressed left-side signal lights (not shown) of left-side signal circuit 155) are energized. When energized, right-side signal lamp and/or left-side signal lamp (not shown) may "blink" as is common to all turn signals.

Actuator Settings: Autonomous and Manual Engaged Settings

In one embodiment, once actuators 40, 50 are activated, at least two engaged settings of actuators 40, 50 are possible: (1) autonomous engagement, and (2) manual engagement. The controller 60 in this embodiment is a programmable controller which allows for the programming of actuators with respect to this engagement status.

In an embodiment, an autonomous engaged setting is achieved when an actuator 40, 50 is depressed and released within a short preset duration. In a preferred embodiment, this preset duration should be no longer than what is approximately required for a driver to press a thumb on the steering wheel actuator 40, 50 and release. This duration may be approximately 0.5 seconds, or another duration programmed by a driver to their preference to achieve this objective. When an actuator 40, 50 is pressed and released within this duration the actuator 40, 50 will remain autonomously engaged and the corresponding exterior signal light will continue to flash. If an actuator 40, 50 is pressed for a duration exceeding the preset duration, the actuator 40, 50 becomes manually engaged, and will remain on while being pressed by the driver, and will go off when released by the driver.

In an embodiment of the present invention, if for example an actuator 40 has been autonomously engaged, it will be disengaged if the opposite actuator 50 is pressed for any length of time. In a further embodiment, if an actuator 40, 50 has been autonomously engaged, it will be disengaged if the same actuator is pressed and released within a short preset duration. Such a short preset duration may be the same preset duration required to autonomously engage the actuator, or another duration programmed by the driver to achieve this objective.

Self-Cancelation and Disengagement of an Autonomously Engaged Actuator Setting Via Lane Position Detection Systems Lane Position Detection and Warning Systems ("LP-DWS") are known for use on motor vehicles and are often used to detect a vehicle's relative position within a lane and path on a roadway. Such systems may use video sensors, laser sensors and infrared sensors among other sensors, to assess the roadway and, depending on the road condition, lane position, or perceived hazard, may alert a driver with audio, visual or tactile stimuli such as seat or steering wheel vibrations, to awaken a drowsy driver, correct driving path, or justify the vehicle within the lines of a lane.

One such system is Ford Motor Company's "Lane Keeping System" which uses a forward-facing digital camera mounted behind the windshield inside the rearview mirror to detect unintended lane departures. This system presents three levels of assistance; "Lane Keeping Alert", "Lane Keeping Aid" and "Driver Alert", which are activated based on driver preference, behavior, and the degree of the lane departure. When this system detects that the car is approaching the edge of a lane without a turn signal activated, a yellow lane marker alert displays on the dash and the steering wheel vibrates. If the driver fails to respond to such alerts and continues to depart the lane, the yellow lane marker alert turns red and the system provides steering torque to rotate the steering wheel and the vehicle back toward the center of the lane. The "Driver Alert" monitors the vehicle's movements within the lane markings and will sound alerts if a driving pattern detected is consistent with a drowsy driver.

Ford's rearview mirror assembly for use with its Lane Keeping System is produced by GENTEX Corporation with technology developed by MOBILEYE N.V, of Amstelveen, Netherlands. Some of Mobileye's lane departure and warning systems use vision-based forward-looking technology and algorithms to interpret video images to estimate vehicle roadway lane alignment.

Other automakers have incorporated Mobileye's technology into similar Lane Position Detection systems. BMW has incorporated Mobileye's technology into its Lane Departure Warning System. Mobileye and TRW have partnered to provide camera-based systems for Chrysler, JEEP, GM and Hyundai. Mobileye and Delphi have partnered to provide similar systems for Volvo. Mobileye and Leopold Kostal have partnered to provide similar systems for PSA Peugeot Citroen. Mobilieye and Magna Electronics have partnered to provide similar systems for Honda and Opel, among other partnerships.

Denso Corporation of Japan and Toyota have developed a "Lane Keeping Assist System" which uses a forward-facing stereo camera to detect the shapes and positions of lane markers. This system transmits data from the vision sensor to a steering assist electronic control unit ("ECU") which determines if the vehicle is straying from its lane. If an unintended lane deviation is detected, the ECU alerts the driver with visual and auditory alerts. The ECU may also send a steering torque signal to the electric power steering ("EPS") controller to apply a slight counter-steering torque to realign the vehicle within the lane.

BOSCH of Germany has developed a Multi Purpose Camera ("MPC") for use in video-based driver assistance systems such as LPDWS. Bosch's MPC is an integrated unit which contains its own microprocessor and does not require a separate control unit.

A cornerstone characteristic of the systems developed by Mobileye, Denso, Bosch and other similar systems under different brand names offered by different technology companies and automobile manufacturers, are the systems' ability to continuously assess the vehicle's relative position within the lines of a lane and communicate such information to various accessory components.

In a preferred embodiment, this Turn Signal Safety System ("TSSS") uses the lane position information obtained from such a lane position detection type system ("LPDS") to self-cancel an autonomously engaged turn signal actuator 40, 50 and corresponding exterior signal light after a lane change has been detected. In a preferred embodiment, the LPDS is interfaced with this TSSS so that the two systems my communicate information. In such an embodiment, once a turn signal has been autonomously engaged, the controller 60 will "disengage" an autonomously engaged turn signal when the LPDS has detected that the vehicle has fully exited one lane and fully entered a "new" lane and is driving approximately justified within that lane.

After the system detects that a vehicle has exited one lane and entered a new lane, the system may determine that a vehicle is driving justified within the lines of a new lane if the vehicle maintains a driving path within the lines of a new lane for a minimum preset duration of time. Such duration may be approximately 1-2 seconds, or a few seconds, or another programmable duration of time sufficient to determine that the vehicle has entered the desired new lane and the desired lane change has been completed.

In another embodiment, once a turn signal has been autonomously engaged and the LPDS has detected that the vehicle has exited one lane and entered another lane, the controller 60 will not disengage an autonomously engaged turn signal if the LPDS detects that the vehicle is continuing to turn in the same direction as the autonomously engaged actuator 40, 50. Such an autonomously engaged actuator 40, 50 will disengage when the system has determined that the vehicle has entered a new lane and is driving approximately justified within the lane for a preset duration as described.

Self-Cancelation and Disengagement of an Autonomously Engaged Actuator Setting Via Steering Wheel Rotation, Torque and Angle Detection Systems Systems for determining the rotation and angle of a steering wheel have been used for many years in various systems including Power Steering Systems ("PSS"). One example of a PSS which incorporates a steering wheel angle sensor is Ford's Electric Power-Assisted Steering ("EPAS"). Ford's EPAS system provides greater or reduced steering wheel rotation assistance to a driver based on vehicle speed, road conditions and the degree of angle rotation of the steering wheel. This system generally provides more assistance at lower speed and less assistance at higher speed. This makes parking more effortless and highway driving more controllable. Such systems generally include a controller among other components.

Other systems which use steering wheel angle sensors include "Active Steering Systems". Such systems adjust the degree of steering wheel rotation and angle required for turns based on the speed of the vehicle. For example, AUDI and BMW provide similar systems which alter the steering ratio based on the speed of the vehicle in the following manner: at a low speed, such as parking, a slight turn of the wheel creates a greater degree of driving wheel directional change. At a higher speed, a comparable degree of steering wheel turn creates a lesser degree of driving wheel directional change to provide maximum control over the vehicle.

Steering Wheel Angle Sensors ("SWAS") are also used in on-board stability-control systems ("SCS") such as BMW's "Dynamic Stability Control System" ("DSC") which maintains a vehicle's intended course in the event of a driver's inadvertent under- or over-steers, or on surfaces where some or all of the wheels have different levels of traction. Such systems generally include a controller among other components.

BMW Dynamic Stability system is a type of Electronic Stability Control system ("ESC") which is now mandatory on new cars in the United States and many countries worldwide. Generally, when an ESC system detects a probable loss of steering control, the system estimates the direction of the skid and then applies breaking to individual wheels to counter the skid and bring the vehicle back in line with the driver's intended path.

ESC system determines a driver's intended path by assessing data received from a steering wheel angle sensor, which constantly monitors the steering wheel position and outputs the information to the ESC electronic control unit. ("ECU"). The ESC determines a vehicle's actual direction by data output received to its ECU from multiple sensors and systems which include the anti-lock breaking system ("ABS"), individual wheel speed sensors, lateral acceleration sensors and vehicle rotation sensors (YAW).

The ESC is connected with these various sensors and systems via a Controller Area Network ("CAN" bus) interface which permits their communication. Once the ESC has determined a driver's intended path and compared it against the vehicle's actual position, if the ESC determines that the vehicle is in a skid, it may send commands to connected systems such as the ABS to apply breaking to individual wheels to correct the vehicle path. Some ESC systems are also capable of reducing engine throttle amounts until vehicle control is regained. In many vehicles, an ESC system will inform the driver if it has intervened with a dashboard light and/or tone.

Various steering wheel rotation and angle detection systems are often comprised of sensors and components specifically designed to assess steering wheel torque, rotation and angle. One such sensor for use in automobiles has been developed by Bourns, Inc. of Riverside, Calif., which manufactures a combined steering torque and angle sensor for use with Electric Power Assisted Steering applications and ESC. Bourns' combined sensor may be used in both steering column and steering rack mounted EPAS and provides CAN steering sensor output.

Another such steering wheel position sensor for use in automobiles has been developed by Bosch of Germany. The Bosch model LWS6 Steering-Angle Sensor uses Hall Effect technology to detect magnetic field changes in a multi-pole magnet affixed to the steering column. This sensor translates magnetic field changes into square-wave signals which are transmitted to the control unit to derive the position, rotation direction, and rotation speed of the steering wheel.

In an embodiment of the present invention, this Steering Wheel TSSS may be interfaced with a steering wheel rotation and angle detection sensor or system such as those described and others with similar capabilities, so that an autonomously engaged turn signal actuator 40, 50 may be disengaged when certain steering wheel rotation and/or steering wheel angle changes or patterns are detected. In such an embodiment, an actuator 40, 50 may be autonomously engaged by a driver at any degree of steering wheel 10 rotation and subsequently disengaged in various ways. For example, an actuator 40, 50 may be autonomously engaged by a driver when the steering wheel 10 is turned Left, Center or Right.

When a motor vehicle that has been modified to include the system and apparatus of the present invention, the following example illustrates adaptations of the present invention in which actuators 40, 50 are activated and a steering wheel angle and rotation sensor system is used to disengage an autonomously engaged turn signal actuator 40, 50:

1) An actuator 40, 50 is autonomously engaged providing an autonomously energized exterior signal light.
2) The steering wheel rotation and angle sensor system determines the rotation and angle of the steering wheel 10 at the moment the actuator 40, 50 is engaged.
3) If the actuator 40, 50 is engaged when the steering wheel 10 is at approximately center, the signal will disengage after the steering wheel 10 is turned to a minimum preset degree of angle in the same direction of the engaged actuator 40, 50 and then returned to approximate center. For example, if the steering wheel 10 is approximately center when the right actuator 40 is engaged, the steering wheel 10 must first rotate to a minimum preset angle to the right, and must subsequently be rotated to approximately center for the autonomously engaged actuator 40 to disengage. Such minimum preset degree of angle may be approximately 45 degrees.
4) If the actuator 40, 50 is engaged when the steering wheel 10 is rotated to a minimum preset degree of angle other than approximately center, and the direction of the actuator 40, 50 and the rotation of the steering wheel 10 are both in the same direction, the signal will disengage when the steering wheel 10 reaches the center position. For example, if the steering wheel 10 is rotated to a minimum preset degree of angle to the left when the left actuator 50 is engaged, the autonomously engaged actuator 50 will disengage when the steering wheel 10 is rotated to approximately center. Such minimum preset degree of angle may be approximately 45 degrees.
5) If the actuator 40, 50 is engaged when the steering wheel 10 is rotated to a minimum preset degree of angle other than approximately center, and the direction of the actuator 40, 50 and the rotation of the steering wheel 10 are in opposite directions, the signal will disengage when the steering wheel 10 has been rotated to a preset minimum degree of angle in the direction of the actuator 40, 50 past center and subsequently returned to center. For example, if the steering wheel 10 is turned to a minimum preset degree of angle to the right when the left actuator 50 is autonomously engaged, the autonomously engaged actuator 50 will disengage when the steering wheel 10 is first turned to a minimum degree of angle to the left and subsequently rotated to center. Such minimum preset degree of angle may be approximately 45 degrees.

Although it is understood that the steering wheel 10 center position is generally considered to represent a specific angle, degree of rotation, or position, an approximately center position provides a range including a specific center location and locations offset from center. For example, if center is deemed to be both 0 and 360 degrees, an approximately center range may provide a range from 350 to 10 degrees, or 355 to 5 degrees, or may include a range that is a specific fixed point such as 360 and 0 degrees, or another range.

The minimum preset angle of rotation described could be approximately 45 degrees, or another degree of angle which is sufficient to differentiate such an angle from an approximately center position.

In an embodiment in which the present invention is interfaced with a system capable of monitoring both the angle of the steering wheel 10 and the speed of the vehicle, such as an ESC system, the minimum preset angle of steering wheel rotation sufficient to differentiate such an angle from an approximately center position, for the purposes of registering that a turn has occurred, may be varied based on the speed of the vehicle. For example, the TSSS controller may be programmed to require a greater angle of steering wheel 10 rotation at lower speed, where many vehicles may be required to turn around corners of city blocks, and a lesser angle of steering wheel 10 rotation at higher speeds where such an angle may not be required for highway lane changes or for safe turns. The objective of such a configuration is to reduce instances in which an autonomously engaged turn signal fails to cancel after a turn or lane change has been completed.

Automobile manufacturers such as NISSAN have developed systems commonly referred to as "Steer-By-Wire" ("SBW"). SBW systems are generally considered to be systems which replace the mechanical control systems such as a steering rack or steering column with electronic signals, electromechanical actuators and other components. NISSAN's SBW system uses a steering force sensor connected to the steering wheel to determine the driver's steering angle, and adjusts the wheels accordingly to steer the car in the desired direction.

In an embodiment of the present invention, this Steering Wheel TSSS may be interfaced with a SBW system and more specifically may be interfaced with the SBW controller or electronic control unit so that steering wheel angle and rotation data collected by the SBW system may be communicated to this Steering Wheel TSSS so that an autonomously engaged turn signal actuator may be disengaged when certain steering wheel rotation and/or steering wheel angle changes or patterns are detected.

When a motor vehicle that has been modified to include the system and apparatus of the present invention, the following example illustrates adaptations of the present invention in which actuators 40, 50 are activated and a SBW system which calculates steering wheel 10 angle and rotation is used to disengage an autonomously engaged turn signal actuator 40, 50:

1) An actuator 40, 50 is autonomously engaged providing an autonomously energized exterior signal light.
2) A SBW system determines the rotation and angle of the steering wheel 10 at the moment the actuator 40, 50 is engaged.
3) If the actuator 40, 50 is engaged when the steering wheel 10 is at approximately center, the signal will disengage after the steering wheel 10 is turned to a minimum preset degree of angle in the same direction of the engaged actuator 40, 50 and then returned to approximate center. For example, if the steering wheel 10 is approximately center when the right actuator 40 is engaged, the steering wheel 10 must first rotate to a minimum preset angle to the right, and must subsequently be rotated to approximately center for the autonomously engaged actuator 40 to disengage. Such minimum preset degree of angle may be approximately 45 degrees.
4) If the actuator 40, 50 is engaged when the steering wheel 10 is rotated to a minimum preset degree of angle other than approximately center, and the direction of the actuator 40, 50 and the rotation of the steering wheel 10 are both in the same direction, the signal will disengage when the steering wheel 10 reaches the center position. For example, if the steering wheel 10 is rotated to a minimum preset degree of angle to the left when the left actuator 50 is engaged, the autonomously engaged actuator 50 will disengage when the steering wheel 10 is rotated to approximately center. Such minimum preset degree of angle may be approximately 45 degrees.
5) If the actuator 40, 50 is engaged when the steering wheel 10 is rotated to a minimum preset degree of angle other than approximately center, and the direction of the actuator 40, 50 and the rotation of the steering wheel 10 are in opposite directions, the signal will disengage when the steering wheel 10 has been rotated to a preset minimum degree of angle in the direction of the actuator 40, 50 past center and subsequently returned to center. For example, if the steering wheel 10 is turned to a minimum preset degree of angle to the right when the left actuator 50 is autonomously engaged, the autonomously engaged actuator 50 will disengage when the steering wheel 10 is first turned to a minimum degree of angle to the left and subsequently rotated to center. Such minimum preset degree of angle may be approximately 45 degrees.

The minimum preset angle of rotation described could be approximately 45 degrees, or another degree of angle which is sufficient to differentiate such an angle from an approximately center position.

Interfacing with a Lane Position Detection System.

Embodiments of the present invention provide an interface between the turn signal systems of the present invention and lane detection systems to disengage an autonomously engaged turn signal in turns which do not result in a lane change. Many turning situations which require a driver to signal an intended turn do not always result in a lane change, for instance, exiting a highway. Highway exits and entrances, among other situations in which a driver executes a turn without changing a lane, are also frequently situations in which the degree of steering wheel angle rotation required for the turn is insufficient to cancel an engaged turn signal lever once the steering wheel is returned to center. Many roadway exits and entrances follow a gradual corkscrew, semi-corkscrew, curved, or diagonal type path designed with a very slight turning angle so as to provide a driver with the safest and least abrupt transition from one roadway to the next.

These situations also highlight a shortcoming in the functionality of the traditional turn signal lever. Specifically, the slight turn angle is often insufficient to cancel an engaged turn signal once the steering wheel has been returned to center. This scenario precipitates a common hazard when a vehicle's turn signal remains on after it is needed whereby transmitting inaccurate information to other drivers. These situations also require a driver to remove his/her hand from the steering wheel, or alter their grip, to cancel the on-going signal. This requirement again detracts from the optimal control achieved by driving with two hands on the steering wheel. It is therefore important to provide a system for disengaging an autonomously engaged turn signal by detecting when a turn has been completed, even if such a turn does not result in a lane change, and in situations where the turning angle is very slight.

In an embodiment of the present invention, a LPD type system, which is capable of determining whether a roadway is straight or curved, is interfaced with this turn signal system so that the two systems may communicate information. In such an embodiment, once a turn signal has been autonomously engaged, the controller 60 will disengage an autonomously engaged turn signal when the LPD system has detected that the vehicle has completed a turn even if no lane change has occurred.

For example, if a turn signal is autonomously engaged when the LPD system has determined that the vehicle is driving approximately straight, the system will disengage an autonomously engaged turn signal after the LPD system detects that the vehicle has turned in the same direction of the turn signal to a certain degree and subsequently returned to a straight course for a preset duration.

In another example, if a turn signal is autonomously engaged when the vehicle is already driving in a turn, the system will disengage the turn signal after the car has driven in the same direction of the turn signal and returned to a straight driving course for a preset duration.

In another example, if a turn signal is autonomously engaged in the opposite direction of the driving turn, the system will disengage the turn signal after the car has turned in the direction of the turn signal and subsequently returned to a straight driving course for a preset duration.

Interfacing with a Lane Departure Warning System

Embodiments of the present invention provide an interface between turn signal systems of the present invention and LPD and lane departure warning systems ("LDWS"). A benefit of such an interface is to improve deficiencies incurred when such systems are interfaced with the traditional stalk-type turn signal lever. As described, LPD and LDWS are often used to detect a vehicle's relative position within a lane or path on a roadway, and are further used to alert a driver if an unintended deviation from a lane is detected. One apparently common characteristic of such systems is that a lane deviation is deemed "unintended" or "intended" depending upon whether a driver has engaged a turn signal in advance of, or in some instances during, a turn. Generally, when a turn signal is engaged, LDWS enter a dormant state which persists until the turn signal is disengaged. In such a state the LDWS does not provide any warnings, alerts or corrective measures to the driver.

An apparent critical shortcoming of such LDWS is that they function at the mercy of the turn signal. Specifically, if a turn signal fails to cancel after a lane change has been completed, which is a common occurrence, the LDWS will remain dormant after it is needed once again to safely provide necessary warnings to drivers. The functionality of the traditional turn signal lever, and its well-known inexactitude and deficiencies, detract from the full impact of innovative safety enhancement systems such as LPD and LDWS.

It would therefore be beneficial to provide a turn signal system and apparatus which, when interfaced with a LDWS, will disengage an autonomously engaged turn signal after a turn or lane change has been detected so as to restore the safety functions of such a LDWS at the earliest possible interval, and to further avoid instances when a turn signal remains inadvertently engaged after a lane change or turn has been completed. The interface system of the present invention provides a remedy for the problems described by having the LDWS disengage the turn signal and thereby restore the LDWS to an active status at the earliest possible moment after a lane change has been detected.

The embodiments described herein offer non-limiting examples of how the turn signal system of the present invention may be interfaced with a LPD and LDWS to disengage an autonomously engaged turn signal of the present invention after a turn or lane change has been completed to provide a re-activated LDWS which is not subject to the inexactitude of the traditional turn signal lever.

Interfacing with a Steering Wheel Angle and/or Rotation Sensor System

In further embodiments, the turn signal systems of the present invention are simultaneously interfaced with the LPD system and a steering wheel angle and rotation sensor system to disengage an autonomously engaged turn signal with the steering wheel angle and rotation sensor system if the LPD system fails to detect a lane change or turn.

As described herein, an advantage of LPD systems and LDWS is to provide safety benefits and means for detecting a vehicle's position on the roadway. However, such systems are not infallible and may not always be able to determine if a lane has been changed, or a turn commenced or completed. LPD and LDWS typically determine a vehicle's lane position based on road markings. Road markings such as painted lane markings may vary to such a degree that, at times, such visual-based systems cannot accurately determine the boundaries of a lane. For example, a car could exit a lane with clear markings and enter a lane with vague markings possibly preventing the LPD system from accurately determining if a lane change has been executed. Such systems may also misread the roadway if confronted with various types of weather conditions, including, for example, sunlight directed into the system's cameras. If a lane position detection-type system is interfaced with the TSSS of the present invention, and further used to disengage an autonomously engaged turn signal by detecting when a lane change or turn has been completed as illustrated by embodiments herein described, it would therefore be advantageous to combine such a system with a SWARS system to detect when a turn has been completed in the event that the LPD system fails to accurately determine if a lane change or turn has been executed.

Some non-limiting examples of how a LPD system and a SWARS system may be cooperatively interfaced with the TSSS of the present invention to disengage an autonomously engaged turn signal after a turn has been completed even in instances when the LPD system fails to accurately assess the roadway, are illustrated in the following examples.

For the case where a LPD system more accurately assesses the roadway and a vehicle's driving path than does a SWARS system, if the LPD system determines that it is obtaining requisite information to assess a vehicle's position within a lane, the lines of a lane, a turn, or a vehicle's overall driving path, the determination to disengage an autonomously engaged turn signal will be made by the LPD system and not by the SWARS system.

In an embodiment of the present invention, if the LDP system determines that it is not obtaining requisite information to assess a vehicle's position within a lane, the lines of a lane, a turn, or a vehicle's overall driving path, the determination to disengage an autonomously engaged turn signal will be deferred to the SWARS system.

In a further embodiment, the relationship between the control components may be configured so as to permit the SWARS system to disengage an autonomously engaged turn signal if it determines that a turn has been made and the steering wheel 10 has been returned to approximately center for a preset duration of time sufficient to typically permit the LPD system to assess a vehicle's driving path with wheels straight, but has failed to do so. In this scenario, the SWARS system will control because the SWARS have detected a turn and subsequently detected that the steering wheel 10 has been returned to approximately center, yet the LPD system has failed to disengage the autonomously engaged turn signal.

In the aforementioned configuration, it is therefore possible for the SWARS system to disengage an autonomously engaged turn signal even in a scenario when the LPD system has not indicated that it has insufficient roadway information, but may nonetheless have insufficient information to accurately assess the roadway. For example, if a LPD System is typically capable of determining if a vehicle has successfully entered a new lane after exiting a lane within 5 seconds, yet fails to do so within 5 seconds, and the SWARS System determines that the turn has been completed and the steering wheel 10 has been rotated to approximately center for a lapsed time of 10 seconds, the SWARS System will disengage the autonomously engaged turn signal. This type of configuration would therefore put a 10 second time limit after any turn has been completed, as assessed by the SWARS system, before the SWARS system disengages an autonomously engaged turn signal.

The foregoing embodiments provide non-limiting examples of how LPD systems and SWARS systems may be configured to disengage an autonomously engaged turn signal, and additional examples of how each system may be given priority to do so.

With respect to Table 1, TSSS determinations to disengage an autonomously engaged turn signal actuator based on outputs received from an interfaced SWARS system.

A SWARS system is generally understood to be a type of system which is capable of assessing the changes in turning position of a Steering Wheel and outputting that data to other components including this TSSS.

TABLE 1

TSSS Determinations Based on SWARS Output

| Conditions | Steering Wheel Angle and Rotation position when a turn signal actuator is initially autonomously engaged (output) | Steering Wheel Angle and Rotation behavior after a turn signal actuator has been autonomously engaged (output) | Turn Signal Safety System's determination based on output from Steering Wheel Angle and Rotation Sensor System |
|---|---|---|---|
| | (1) Actuator is engaged when the steering wheel is approximately centered | (2) Steering wheel is turned to a preset degree in the same direction as the engaged turn signal actuator and is subsequently returned to approximately center | (3) Disengage turn signal actuator |
| | (1) Actuator is engaged when the steering wheel is rotated to a preset degree in the same direction of the engaged actuator | (2) Steering wheel is returned to approximately center | (3) Disengage turn signal actuator |
| | (1) Actuator is engaged when the steering wheel is rotated to a preset degree in the opposite direction of the engaged actuator | (2) Steering wheel is turned to a preset degree in the same direction as the engaged turn signal actuator and is subsequently returned to approximately center | (3) Disengage turn signal actuator |

With respect to Table 2, TSSS determinations to disengage an autonomously engaged turn signal actuator based on outputs received from an interfaced LPD System.

A LPD system is generally understood to be a type of system which is capable of assessing a vehicle's path on a roadway and position within a lane and outputting data to other components.

TABLE 2

TSSS Determinations Based on LPDS Output

| Conditions | Vehicle driving position when a turn signal actuator is initially autonomously engaged (LPDS output) | Vehicle behavior after a turn signal has been autonomously engaged (LPDS output) | Turn Signal Safety System's determination based on LPDS output |
|---|---|---|---|
| | (1) Approximately justified within a lane | (2) Exits lane, enters another lane, and maintains a justified path within the lines of the lane for a preset duration | (3) Disengage turn signal actuator |
| | (1) Approximately in the progress of a lane change | (2) Exits lane, enters another lane, and maintains a justified path within the lines of the lane for a preset duration | (3) Disengage turn signal actuator |
| | (1) Approximately straight on an unmarked roadway | (2) Turns in the direction of the turn signal and subsequently drives approximately straight for a preset duration | (3) Disengage turn signal actuator |
| | (1) Turning | (2) Turns in the direction of the turn signal and subsequently drives approximately straight for a preset duration | (3) Disengage turn signal actuator |

With respect to Table 3, TSSS determinations to disengage an autonomously engaged turn signal actuator based on outputs received from an interfaced LPD system and a SWARS which are cooperatively configured.

Table 3 represents a configuration in which the TSSS will give preference to output from the LPD system over a SWARS upon condition that the LPD system has requisite information to make the necessary roadway determinations.

Table 3 further represents a configuration in which an autonomously engaged turn signal actuator may be capable of disengagement by the SWARS output at all times.

In yet a further embodiment, upon initial activation of actuators 40 and 50, a display screen (not shown), such as a liquid crystal display ("LCD") mounted in the motor vehicle

TABLE 3

TSSS Determinations Based on Various LPDS Output And SWARS Output

| Conditions ↓ | Turn signal actuator is autonomously engaged | LPDS has requisite information to determine lane and/or roadway position? | Has the LPDS determined that a turn has been completed? | Has the SWARS determined that a turn has been made and the steering wheel returned to approximately center? | Has the Steering Wheel returned to center for preset duration sufficient to permit the LPDS to determine if a turn has been completed? | Has the LPDS outputted sufficient data to the TSSS? | Turn Signal Safety System's determination to disengage an autonomously engaged turn signal actuator |
|---|---|---|---|---|---|---|---|
| | Yes | Yes | Yes | Yes | Yes | Yes | Relies on the LPDS |
| | Yes | Yes | No | Yes | Yes | No | Relies on the SWARS |
| | Yes | No | No | Yes | Yes | No | Relies on the SWARS |

With respect to Table 4, LDWS determinations to activate and deactivate based on outputs received from this TSSS and a LPD system.

A LDWS is generally understood to be a system which may alert a driver via auditory, visual and tactile stimuli if an unsafe driving behavior, or an unintended lane change, is detected via outputs from an interfaced LPD System.

could display a selectable option for always on. The use of LCD's in motor vehicles is well known. Such motor vehicle LCD are driven by computers on board the motor vehicle. In the present embodiment, controller 60 could interface with the on board computer or, alternatively, controller 60 could be a component of the on board computer either as a hardwired component, a programmed component such that

TABLE 4

LDWS Sequential Determinations Based On Turn Signal Status And LPDS Output

| Conditions ↓ | Vehicle position when a turn signal actuator is initially autonomously engaged (LPDS output) | Lane Departure Warning System Status based on LPDS and TSSS output | Vehicle behavior after a turn signal has been autonomously engaged (LPDS output) | Lane Departure Warning System Status based on LPDS and TSSS output | Turn Signal Safety System's determination based on LPDS output | Lane Departure Warning System Status based on LPDS and TSSS output |
|---|---|---|---|---|---|---|
| | (1) Driving approximately justified within a lane | (2) Driver warnings deactivated (intentional lane change detected) | (3) Exits lane in the same direction of the turn signal actuator, enters another lane, and maintains a justified path within the lines of the lane for a preset duration | (4) Driver warnings remain deactivated until turn signal actuator is disengaged | (5) Disengage turn signal actuator | (6) Driver warnings reactivated |
| | (1) Driving approximately justified within a lane change detected) | (2) Driver warnings deactivated (intentional lane | (3) Exits lane in the opposite direction of the turn signal actuator | (4) Driver warnings reactivated (unintentional lane change detected) | (5) Disengage turn signal actuator | (6) Driver warnings reactivated |
| | (1) Driving approximately straight | (2) Driver warnings deactivated (intentional turn detected) | (3) Turns in the direction of the turn signal and subsequently drives approximately for a straight preset duration | (4) Driver warnings remain deactivated until turn signal actuator is disengaged | (5) Disengage turn signal actuator | (6) Driver warnings reactivated |
| | (1) Turning | (2) Driver warnings deactivated (intentional turn detected) | (3) Turns in the direction of the turn signal and subsequently drives approximately straight for a preset duration | (4) Driver warnings remain deactivated until turn signal actuator is disengaged | (5) Disengage turn signal actuator | (6)Driver warnings reactivated |
| | (1) Turning | (2)Driver warnings deactivated (intentional lane change detected) | (3) Turns in the opposite direction of the turn signal | (4) Driver warnings reactivated (unintentional turn detected) | (5) Disengage turn signal actuator | (6) Driver warnings reactivated | the on board computer is programmed to perform the function of controller 60, or a combination of the two configurations. If a motor vehicle operator enters "YES," for example, in response to being queried to elect or decline the "always on" option, the selection of the "always on" option is stored in the on board computer's electronic memory or in a digital memory device attached to the on board computer, such that actuators 40 and 50 are activated upon all subsequent start ups of the motor vehicle until the setting is changed.

In other embodiments, the systems and apparatus of the present invention may be used to control equipment components of the motor vehicle other than the turn signals. Such embodiments of the present invention are directed towards allowing a driver to maintain a four-fingered grip on the steering wheel while operating the vehicle's components. Such components may include, but are not limited to, climate control, accessing and controlling the motor vehicle's audio system or a connected device, accessing and using the motor vehicle's navigation system, accessing and using the motor vehicle's cellular telephone, turning on and off the motor vehicle's BLUETOOTH system, accessing the Internet, and shifting the motor vehicle's transmission. Other components which may be controlled by the control system apparatus of the present invention will be recognized by those of ordinary skill in the art.

In one embodiment, with reference to FIG. 13, actuators 40 and 50 function as a computer-driver interface with processor 70 of controller 60, which are collectively used to permit paddle shifting or thumb shifting of a motor vehicle's transmission 250. The present embodiment thus provides an integrated motor vehicle thumb shifter system. For actuators 40 and 50 to be used for thumb shifting, controller 60 would send an electrical signal to system controller 260 which in turn would cause transmission 250 to change gears. System controller 260 may be electromechanical or hydro-mechanical and is of the type well known in the art for operating paddle shifted transmissions. One such system is described in U.S. Pat. No. 7,892,143 (the '143 Patent"). The '143 Patent also describes a complete paddle shift system including controller, transmission and clutch which may be adapted for use with the present invention. System controller 260 would operate those ancillary systems necessary to shifting transmission gears, as well understood by those of ordinary skill in the art, including the transmission itself and the clutch (not shown). The clutch may be one of many different types of clutch known in the art including an electric clutch.

A non-limiting example of how controller 60 could be programmed to permit use of actuators 40 and 50 as thumb shifters is presented. The thumb shifting function could be engaged when the motor vehicle's transmission is in the drive position and both actuators 40 and 50 are simultaneously depressed for a pre-set duration. Right actuator 40 would control shifting up through the gears, that is to say shifting from a lower gear such as first gear to a higher gear such as second gear and the left actuator 50 would control shifting down through the gears from a higher gear to a lower gear. Pressing both actuators 40 and 50 simultaneously for a pre-set duration of time would cause controller 60 to change the transmission to the neutral gear position. In a further embodiment, pressing both actuators 40 and 50 simultaneously while also pressing the motor vehicle's brake pedal would put the transmission in the neutral position. Selecting a transmission gear and exiting from the neutral position by either shifting up or shifting down would be determined by the vehicle's engine's RPM (revolutions per minute) and/or the motor vehicle's speed as calculated by an onboard computer so that the gear selection would not damage the motor vehicle's engine and would be in a gear that corresponds to optimized power band based on engine revolutions per minute, as will be understood by those of ordinary skill in the art. The actuators 40 and 50 would be deactivated by simultaneous depression for a pre-set time that is significantly longer than the duration which causes the transmission to be shifted to the neutral position. Once actuators 40 and 50 are deactivated as thumb shifters, the control of the transmission would revert back to the native automatic transmission state.

Figure 14:
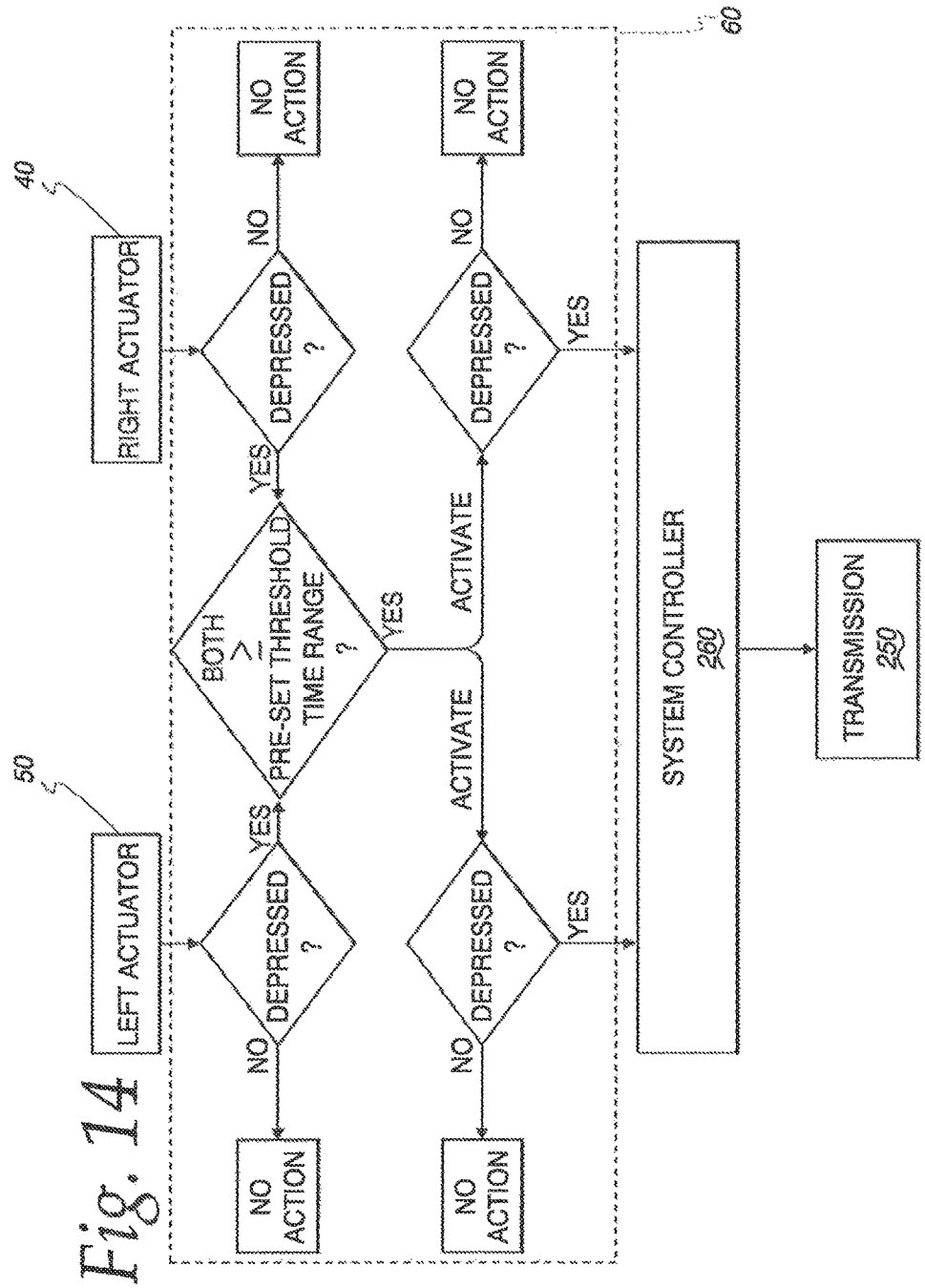
FIG. 14 is a logic diagram of an embodiment of the system of the present invention showing a steering wheel, controller, interface controller and equipment component.

FIG. 14 illustrates the circuit logic of one embodiment of the present invention in which actuators 40 and 50 provide thumb-shifting functionality to a motor vehicle. In this embodiment, when actuator 40 is depressed it is in a closed position and it completes a circuit to controller 60. Similarly, when actuator 50 is depressed it completes a circuit to controller 60. If both actuator 40 and actuator 50 are depressed, controller 60 via timer 90 (shown in FIG. 13) measures the time each of actuator 40 and actuator 50 is depressed. If the measured time is within a pre-set activation threshold time range, then controller 60 activates actuators 40, 50. If the measured time is outside of the pre-set activation threshold time range, controller 60 does not activate actuators 40, 50. The pre-set activation threshold time range can be varied and programmed into memory 100 shown in FIG. 13 such that logic circuits 80 of FIG. 13 in controller 60 activate actuators 40, 50. Once activated, actuators 40 and 50 may then be used as thumb shifters and controller 60 via timer 90 (shown in FIG. 13) measures the time each of actuator 40 and actuator 50 is depressed. There will be, in this example, two pre-set threshold time ranges: a first pre-set threshold time range described above which determines whether or not actuators 40, 50 are to be activated and a pre-set neutral time range. The pre-set threshold time ranges will vary based on the function which the actuators 40 and 50 are to perform. For example, to activate actuators 40 and 50 as thumb shifters actuators 40 and 50 would be depressed for a preferred 1 to 2 second duration, although this duration may range from about 0.1 second to 1 second or 0.5 seconds to about 5 seconds. When actuators 40 and 50 are simultaneously depressed after having been activated and released and then depressed again for a duration within a time range of, for example, about 0.1 to about 1 seconds, actuators 40 and 50 signal controller 60 that system controller 260 is to put transmission 250 into the neutral position. When actuator 40 is activated in this example of the present embodiment, depressing actuator 40 alone results in controller 60 sending a signal to system controller 260 to operate the motor vehicle's transmission and shift the transmission to a higher gear. When actuator 50 is activated in this example of the present embodiment, depressing actuator 50 alone results in controller 60 sending a signal to system controller 260 to operate the motor vehicle's clutch and shift the transmission to a lower gear.

The embodiments of the present invention which utilize actuators 40, 50 as thumb shifters as illustrated in FIG. 13 may be further adapted such that actuators 40, 50 may be used to perform various functions of a conventional shifter as will be understood by those of ordinary skill in the art. The following non-limiting examples (Examples 1-6) are presented to further illustrate such adaptations.

EXAMPLE 1

Activating Actuators 40, 50

When a motor vehicle that has been modified to include the system and apparatus of the present invention, actuators 40, 50 may be activated when the motor vehicle's ignition (not shown) is turned on and the transmission 250 of the motor vehicle is in the neutral or park position. An operator of the motor vehicle may then activate actuators 40 and 50 by simultaneously depressing actuators 40 and 50 for a time that is within a pre-set threshold time range and further described herein above. Alternatively, when the motor vehicle's ignition is turned on and the motor vehicle is stopped (transmission 250 is in the drive position and the motor vehicle operator has engaged the motor vehicle's brake), simultaneously pressing actuators 40 and 50 immediately activates actuators 40 and 50. As further described herein, once actuators 40 and 50 are activated, depressing actuator 40 will cause transmission 250 to be up shifted into gear, from park to first gear for example, and depressing 50 will cause transmission 250 to be downshifted, from park to reverse for example. In yet a further adaptation of the present invention, simultaneously pressing actuators 40 and 50 while the motor vehicle is in motion will immediately activate actuators 40, 50 in the corresponding gear at which transmission 250 in when actuators 40, 50 are activated.

EXAMPLE 2

Operating Actuators 40, 50

When a motor vehicle that has been modified to include the system and apparatus of the present invention, the following example illustrate adaptations of the present invention in which actuators 40 and 50 are activated and are subsequently being used as thumb shifters. In the present adaptation:

1) depressing actuator 40 will cause transmission 250 to be upshifted (from first gear to second gear for example);

2) depressing actuator 50 will cause transmission 250 to be downshifted (from second gear to first gear for example);

3) depressing both actuators 40 and 50 for a first pre-set threshold duration or time range will cause transmission 250 to be shifted into the neutral position; and 4) depressing both actuators 40 and 50 for a second pre-set threshold duration that is longer than the first pre-set threshold duration will turn off actuators 40 and 50.

EXAMPLE 3

Operating Actuators 40, 50—Further Adaptations

When a motor vehicle that has been modified to include the system and apparatus of the present invention, the following examples illustrate adaptations of the present invention in which the motor vehicle's ignition (not shown) is turned on, and actuators 40 and 50 are activated and are subsequently being used as thumb shifters to place the motor vehicle's transmission 250 into the neutral or park position. In the present adaptation:

1) depressing both actuators 40 and 50, simultaneously, for a first pre-set threshold time range or duration will cause transmission 250 to be placed in the neutral position;

2) continuing to depress actuators 40, 50, simultaneously for a second pre-set threshold duration that is longer than the first pre-set threshold duration will cause transmission 250 to be placed in the park position (the park position of transmission 250 cannot be accessed at any time the motor vehicle is not at a complete stop);

3) with the motor vehicle having been placed in the park position as described in step 2) above, releasing both actuators 40, 50 and then simultaneously depressing them for the first pre-set threshold duration will cause transmission 250 to be shifted into the neutral position; and 4) continuing to simultaneously depress actuators 40 and 50 for a third pre-set threshold duration, which is longer than both the first pre-set threshold duration and the second pre-set threshold duration will deactivate or turn off actuators 40, 50.

EXAMPLE 4

Using Actuators 40, 50 to Move the Motor Vehicle Forward

When a motor vehicle that has been modified to include the system and apparatus of the present invention, the following examples illustrate adaptations of the present invention in which the motor vehicle's ignition (not shown) is turned on, and actuators 40 and 50 are activated and are subsequently being used as thumb shifters to move the motor vehicle's transmission 250 from either the park or the neutral position into a forward gear. In the present adaptation:

1) depressing actuator 40 will cause transmission 250 to be placed in first gear and the car will move forward; and 2) in an alternative embodiment of the present adaptation, depressing actuator 40 simultaneously while depressing the motor vehicle's brake pedal will cause transmission 250 to be placed in first gear and the motor vehicle will not move forward until the brake pedal is released.

EXAMPLE 5

Using Actuators 40, 50 to Move the Motor Vehicle in Reverse

When a motor vehicle that has been modified to include the system and apparatus of the present invention, the following examples illustrate adaptations of the present invention in which the motor vehicle's ignition (not shown) is turned on, and actuators 40 and 50 are activated and are subsequently being used as thumb shifters to move the motor vehicle's transmission 250 from either the park or the neutral position into the reverse gear. In the present adaptation:

1) the reverse position of transmission 250 can be immediately engaged when the motor vehicle is stopped and transmission 250 is either in the neutral position or in the park position by depressing actuator 50; and 2) in another embodiment of the present adaptation, the reverse position of transmission 250 can be immediately engaged when the motor vehicle is stopped in either the neutral or park positions with the motor vehicle's brake pedal depressed by depressing actuator 50.

EXAMPLE 6

Using Actuators 40, 50 While the Motor Vehicle is in Reverse

When a motor vehicle that has been modified to include the system and apparatus of the present invention, the following examples illustrate adaptations of the present invention in which the motor vehicle's ignition (not shown) is turned on, and actuators 40 and 50 are activated and are subsequently being used as thumb shifters to move the motor vehicle's transmission 250 into either the park, neutral, or a forward gear position from the reverse gear position. In the present adaptation:

1) While the motor vehicle's transmission is in the reverse position and the motor vehicle is moving backwards, depressing actuators 40, 50 simultaneously will immediately engage the neutral position of transmission 250; and 2) while motor vehicle's transmission is in reverse and the motor vehicle is stopped, depressing actuators 40, 50 simultaneously will engage the transmission neutral position if actuators 40 and 50 are depressed for a first pre-set threshold duration as described herein or, alternatively, depressing actuators 40, 50 simultaneously for second pre-set threshold duration that is longer than the first pre-set threshold duration will cause transmission 250 to be placed in the park position; and 3) while transmission 250 is in the reverse position and the motor vehicle is stopped, depressing actuator 40 will cause transmission 250 to be placed into first gear.

Figure 15:
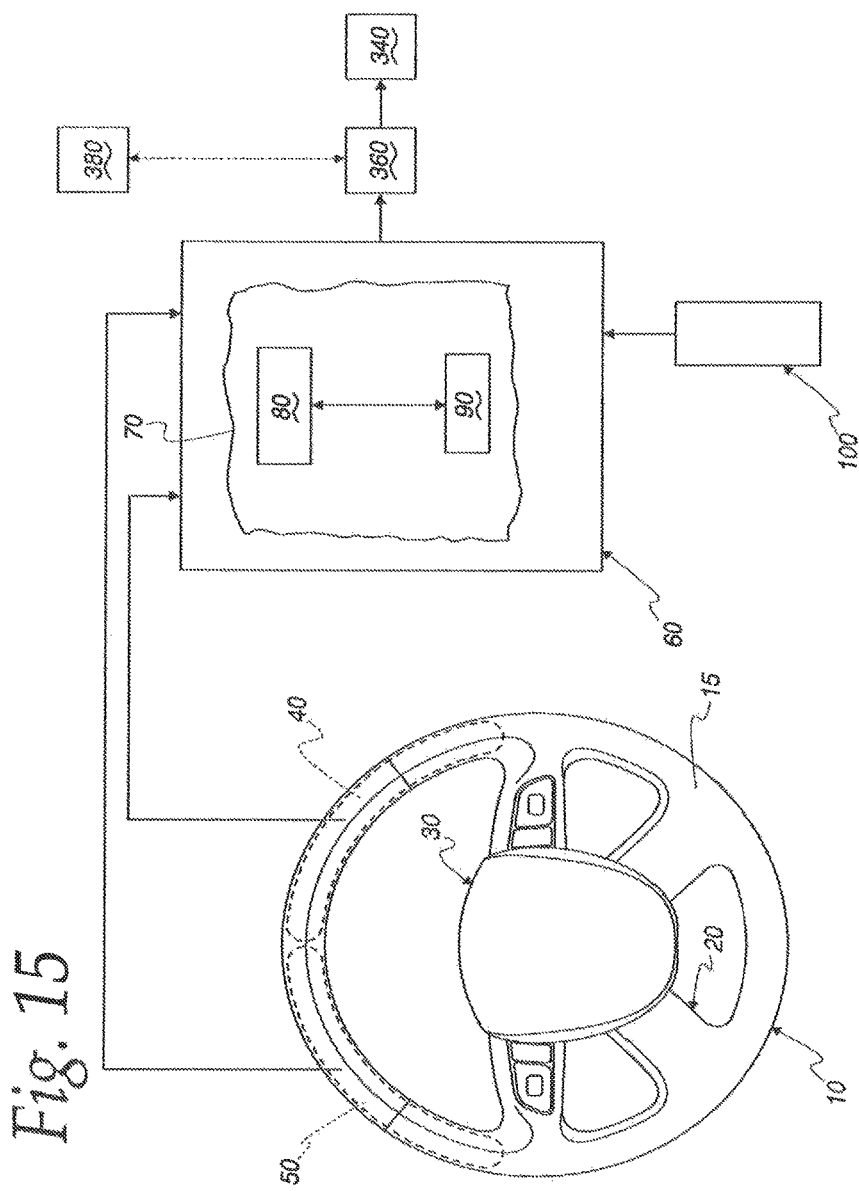
FIG. 15 is a diagram of an embodiment of the system of the present invention showing a steering wheel, controller, interface controller, display screen and equipment component.

In a further embodiment, as illustrated in FIG. 15, controller 60 is connected to interface controller 360 which is native to the vehicle and controls the selection of available equipment components 340 on the motor vehicle and the equipment component functions and provides an integrated motor vehicle equipment component control system. For example, the interface controller 360 could be a computer-driver interface such as a BMW IDRIVE system. The IDRIVE system, illustrated by equipment component 340 in FIG. 15, and similar systems offered in some form by most automakers, provide the operator with the ability to control the setting and operation of various equipment components in the motor vehicle such as a climate control system, an audio system, a navigation system, a cellular phone, a BLUETOOTH device, a system for accessing the internet, and the motor vehicle's turn signals. The available equipment components and their functions are made viewable either via a display screen 380 often located in the center of the dash of the motor vehicle facing the front seat passengers, or a small screen located in the driver's instrument panel often between the speedometer and tachometer facing the driver, or a HUD projected on the windshield in front of the driver, or a combination of these readouts. In this embodiment, interface controller 360 would be programmed to allow the operator to assign a specific function to either actuator 40 or 50 (including a motor vehicle's turn signals) and function selection would be performed by using a system selector native to the vehicle, such as a dial, mouse, joystick, or touch-screen capability incorporated into display screen 380. Such system selector functionality is widely used on commercially available motor vehicles, including passenger automobiles, and is therefore understood by persons of ordinary skill in the art.

As an example of the embodiment of the present invention illustrated in FIG. 15, interface controller 360 would be programmed to allow the operator to assign a specific function to either actuator 40 or 50 and such program would be stored in memory (100 in FIG. 15) and would control which equipment component or function the operation actuators 40 and 50 function affected once the actuators 40 and 50 were activated according to the methods of the present invention. Selection of an equipment component's function would be performed by using a system selector native to the vehicle, such as a dial, mouse, joystick, or touch-screen capability incorporated into display screen 380. Alternatively, controller 60 could be programmed to perform the functions of interface controller 360 as described above. Upon starting the motor vehicle, either by starting the engine by turning the vehicle's electrical power on without starting the engine the motor vehicle operator depresses both actuator 40 and 50 simultaneously for a pre-set duration, a first interval, providing an activated actuator 40, 50. Without releasing actuators 40 and 50, the motor vehicle operator continues to depress both actuators 40 and 50 for an additional pre-set duration, a second interval, which is longer than the first interval. For convenience, the during the first and second intervals an audible signal can be caused to emanate from an audio speaker in the motor vehicle to signal to the motor vehicle operator that the actuators 40 and 50 have been depressed for the appropriate pre-set durations. After actuators 40 and 50 have been depressed for the pre-set second interval, a signal is sent via controller (60) to interface controller 360 causing interface controller 360 to enter a mode for assigning which equipment components and functions actuators 40 and 50 will be assigned to operate. That interface controller 360 has entered the mode for assigning which equipment components and functions actuators 40 and 50 will be assigned to operate could be accompanied by an audible signal and/or a display on display screen 380. The motor vehicle operator could then toggle or scroll through the vehicle's available equipment components and functions with a selector native to the vehicle connected to the controller 360, and, optionally controller 60. The steps of the process of selecting the motor vehicle's equipment components and functions may be displayed on display screen 380. Upon the motor vehicle operator selecting a desired equipment component or function, by for example causing the selection to be highlighted on display screen 380 and then entering the selection at display screen 380, the motor vehicle operator would then depress one of actuator 40, 50 for a pre-set duration which assign that corresponding actuator to the highlighted function. The assignment of the actuator 40 or 50 could be accompanied by an audible signal and/or a display on display screen 380 indicating to the motor vehicle operator that the assignment has been successful. It should be noted that the assignment of an equipment component or function to actuators 40, 50 may be performed via interface controller 360 and display screen 380 even if actuators 40, 50 are not activated. In such an adaptation of the present invention the selection will be stored in the motor vehicle's onboard computer memory until such time as actuators 40, 50 are activated. In a further embodiment, interface controller 360 and display screen 380, or other input/output devices used with a motor vehicle's onboard computer, may be used to activate/deactivate actuators 40, 50.

In further embodiments of the present invention, the duration actuators 40 and 50 are depressed, either simultaneously or individually, could correspond to different functionalities depending on what type of equipment component and function is assigned to the actuator. For example, when actuators 40 and 50 are assigned to control a motor vehicle's audio system, different commands such as pause, next track, previous track, rewind, or fast forward, could correspond to depressing actuators 40 and/or 50 for a short duration, multiple short durations, a long duration, or a combination of any of these durations. Such control functionality is known to be used with IPOD headphones, for example, with the IPOD remote connected to the headphone's right ear wire, as will be readily understood of those of ordinary skill in the art.

Figure 16:
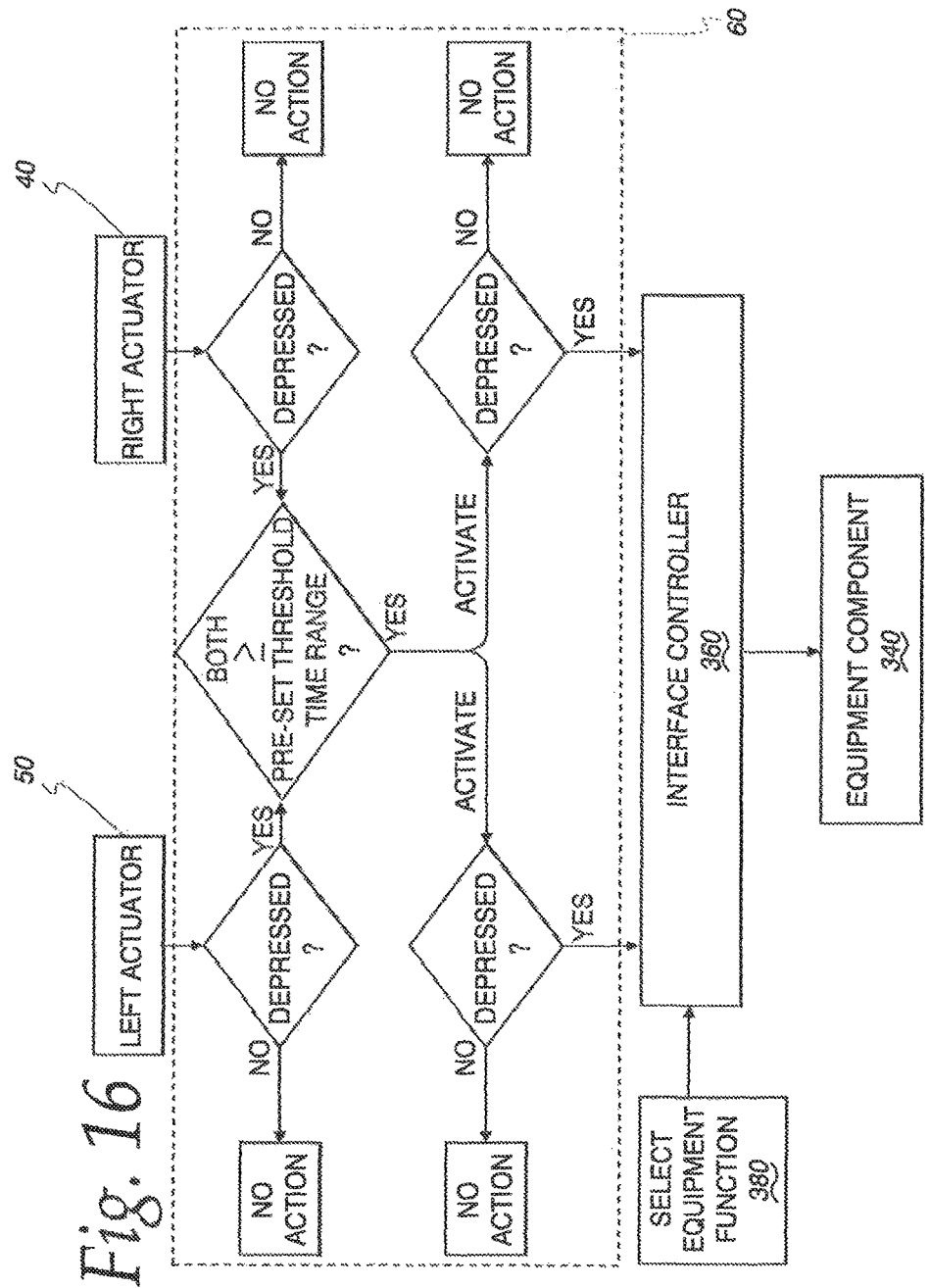
FIG. 16 is a logic diagram illustrating the operation of an embodiment of the present invention which controls an equipment component.

In a further embodiment, which employs actuators 40 and 50 of the present invention as illustrated in FIG. 16, two activation settings for actuators 40 and 50 are possible: (1) actuators 40 and 50 require actuator activation upon each startup of the motor vehicle, or (2) actuators 40 and 50 are always activated when the engine of the motor vehicle is turned on after having once been activated. Controller 60 in this embodiment is a programmable controller or, alternatively, a computer-implemented device, which allows for the programming of actuators 40 and 50 with respect to their on/off status. Thus, if both actuator 40 and actuator 50 are depressed, controller 60 via timer 90 (shown in FIG. 15) measures the time each of actuator 40 and actuator 50 is depressed. Controller 60 may be pre-programmed with two threshold time ranges, for example a first threshold time range and a second threshold time range, such that simultaneously depressing actuators 40 and 50 for a time within the first threshold time range, for example 1 to 2 seconds, activates actuators 40 and 50 only for the period of time the engine of the motor vehicle is turned on. In such instance, actuators 40 and 50 would need to be activated as described each time the motor vehicle is turned on. However, if actuators 40 and 50 are simultaneously depressed and held through the first threshold time range and for a duration within or greater than the second threshold time range, 3 to 5 seconds for example, actuators 40 and 50 are always on in that they are always activated when the engine of the motor vehicle is turned on. If the measured time is within either the first or second threshold time range, then controller 60 activates actuators 40, 50. If the measured time is less than the first threshold time range, controller 60 does not activate actuators 40, 50. The pre-set threshold time ranges can be varied and programmed into memory 100 shown in FIG. 15 such that logic circuits 80 of FIG. 15 in controller 60 activate actuators 40, 50. The pre-set threshold time ranges may range from about 0.1 seconds to about 5 seconds. It is preferred that the first pre-set threshold time range be about 0.1 to 2 seconds and that the second pre-set threshold time range be greater than the first pre-set threshold time range. When activated, depressing actuator 40 causes the interface controller 360 to initiate a function of equipment component 340, while depressing activated actuator 50 causes interface controller 360 to initiate a different function of equipment component 340. For example, the system and apparatus of the present invention may be programmed, as will now be understandable to those of ordinary skill in the art, such that depressing actuator 40 will cause controller 60 to send a signal to interface controller 360 which turns on the motor vehicle's compact disc player, whereas depressing actuator 50 will cause controller 60 to send a signal to interface controller 360 which turns off the motor vehicles compact disc player. Other variations and permutations of this embodiment will be adaptable by those of ordinary skill in the art. The steps of the process of selecting the motor vehicle's equipment components and functions may be displayed on display screen 380. Upon the motor vehicle operator selecting a desired equipment component or function, by for example causing the selection to be highlighted on display screen 380 and then entering the selection at display screen 380, the motor vehicle operator would then depress one of actuator 40, 50 for a pre-set duration which assign that corresponding actuator to the highlighted function. The assignment of the actuator 40 or 50 could be accompanied by an audible signal and/or a display on display screen 380 indicating to the motor vehicle operator that the assignment has been successful.

In yet a further embodiment, the logic diagram illustrated in FIG. 12 (FIGS. 12*a* and 12*b* inclusive) may be adapted for the operation of a motor vehicle equipment component (not shown), such that functions of the motor vehicle component replace the "left signal lamp on" and "right signal lamp on" functions shown in FIG. 12. With reference to FIG. 12, actuator 40 and actuator 50 for purposes of this embodiment are each made up of switch arrays 140, 150, respectively, where each switch array 140, 150 includes a plurality of switches 160. The switches 160 are normally open (off), closed when depressed or selected (on), and return to open (off) when deselected. Each of switches 160 is connected to a controller 60 so that controller 60 may sense when a switch 160 is in the open position or the closed position. In a typical operation, a switch 160 opens and closes an electrical circuit between the switch 160 and the controller 60. If only switches 160 corresponding to a thumb pattern are depressed, then the actuators 40, 50 will be recognized as being "on" by the controller 60. However, if switches 160 corresponding to a pattern larger than a thumb-sized pattern are depressed, then actuators 40, 50 will be recognized as being "off." The controller 60 is programmed to determine when switches 160 are depressed in a thumb-sized pattern. Thus, if a full four-fingered grip is taken of steering wheel 10 a pattern of switches 160 may be depressed, depending on where the driver places his or her hand on the steering wheel, which exceeds the size of the thumb-sized pattern made when a thumb depresses actuators 40, 50. Under this condition, controller 60 does not activate actuators 40, 50 and controller 60 recognizes actuators 40, 50 as being in the "off" position. However, if a thumb is then placed on actuators 40, 50, controller 60 registers that a thumb-sized pattern of switches has been depressed and controller 60 will activate the actuators 40, 50 if they are depressed for at least the pre-set threshold time. When controller 60 activates actuators 40, 50, either one of actuator 40 or actuator 50 may be depressed to initiate the corresponding function of the motor vehicle equipment component (not shown). If controller 60 has not activated actuators 40, 50, then depressing either of actuator 40 or actuator 50 will not initiate the corresponding function of the motor vehicle equipment component (not shown).

The advent of "hands-free" controls in a motor vehicle has been primarily in response to the desire to keep a motor vehicle operator's hands on the wheel. There may be many commands that a motor vehicle operator would prefer to keep secret. In a further embodiment of the present invention, actuators 40 and/or 50 may be used by a motor vehicle operator to covertly send a distress call to 911 while appearing to simply drive the car with two hands where controller 60 is programmed to send a distress call to 911 upon actuators 40 and/or 50 being depressed in a pre-programmed sequence. In vehicles equipped with GPS systems, the distress call could also send police a real-time location and potentially also activate a hidden camera in the car capturing a picture or video image of the perpetrator.

Embodiments of the present invention may be adapted for use in automobiles to operate turn signals, control the high beam light functionality of headlights, control fog lights, operate the automobile's sound and/or entertainment system, operate the automobile's cellular telephone operations, operate a BLUETOOTH system, operate automobile's navigation system, operate the automobile's rear seat DVD player, operate an IPOD connected to the automobile's entertainment system, operate window/sunroof controls, operate parking assist cameras and access and operate an automobile's night vision. Embodiments of the present invention may also be adapted for use in military vehicles such as HUMVEES, JEEPS and trucks. The systems and apparatus herein of integrating actuators into the steering wheel of a vehicle could enable a military vehicle operator to operate a radio, send a distress call, operate the vehicle's navigation system, operate the vehicle's lights, or operate the vehicle's weapons systems. A lone military vehicle operator could, for example, use actuator 50 to rotate a turret gun and actuator 40 to fire it, all the while maintaining a secure grip on the vehicle's steering wheel. Embodiments of the present invention can also be adapted for use on industrial or farming vehicles, marine vessels, fire engines, ambulances, armored cars, police cars, all-terrain vehicles and golf carts.

Thus, it is apparent that there has been provided, in accordance with the present invention, a turn signal activation switch and system and vehicle control system and apparatus for operating the vehicle's components which are, respectively, integral to the rim of a steering wheel that fully satisfies the objects, aims and advantages set forth above.

While the invention has been described in conjunction with specific embodiments thereof, it is evident that many alternatives, modifications and variations will be apparent to those skilled in the art in light of the foregoing description. Accordingly, it is intended that the present invention is not limited by the foregoing description. Rather, it includes all such alternatives, modifications and variations as set forth within the spirit and scope of the appended claims.

The invention claimed is:

1. An integrated motor vehicle equipment component control system comprising:
a motor vehicle steering wheel having an annular ring;
a left actuator, the left actuator attached to the steering wheel annular ring between a 9 o'clock position and a 12 o'clock position on the annular ring;
a right actuator, the right actuator attached to the steering wheel between a 3 o'clock position and the 12 o'clock position on the annular ring;
a controller, the controller connected to the left and right actuators;
a motor vehicle equipment component, the motor vehicle equipment component connected to the controller;
wherein the left actuator and the right actuator do not overlap;
wherein the controller activates the left actuator and the right actuator when the left and the right actuators are depressed simultaneously and held for a pre-set threshold time, thus providing an activated left actuator and an activated right actuator;
wherein an operation of the motor vehicle equipment component is altered when an activated actuator is depressed.

2. The integrated motor vehicle equipment component control system of claim 1, wherein the operation is an autonomous mode.

3. The integrated motor vehicle equipment component control system of claim 1, wherein the operation is a manual mode.

4. The integrated motor vehicle equipment component control system of claim 1, wherein the motor vehicle equipment component is an imaging system.

5. The integrated motor vehicle equipment component control system of claim 4, wherein the imaging system is a camera system.

6. The integrated motor vehicle equipment component control system of claim 1, wherein the motor vehicle equipment component is an entertainment system.

7. The integrated motor vehicle equipment component control system of claim 1, wherein the motor vehicle equipment component is a navigation system.

8. The integrated motor vehicle equipment component control system of claim 1, wherein the motor vehicle equipment component is a global positioning system.

9. The integrated motor vehicle equipment component control system of claim 1, wherein the motor vehicle equipment component is a transmission system.

10. The integrated motor vehicle equipment component control system of claim 1, wherein the motor vehicle equipment component is a lighting system.

11. The integrated motor vehicle equipment component control system of claim 1, wherein the motor vehicle equipment component is a communication system.

12. The integrated motor vehicle equipment component control system of claim 11, wherein the communication system is a Bluetooth® system.

13. The integrated motor vehicle equipment component control system of claim 11, wherein the communication system is an internet access system.

14. The integrated motor vehicle equipment component control system of claim 1, wherein the motor vehicle equipment component is a computer-driver interface.

15. The integrated motor vehicle equipment component control system of claim 14, wherein the computer-driver interface is at least one member of the group consisting of a BMW® iDrive system, an Audi® MMI system, a Mercedes® Command system, a Lexus® Remote Touch system, a Ford® Sync system, and a MyFord Touch® system.

16. The integrated motor vehicle equipment component control system of claim 1, wherein the motor vehicle equipment component is a sensor system.

17. The integrated motor vehicle equipment component control system of claim 16, wherein when the activated actuator is depressed, the operation of the motor vehicle equipment component is altered by the controller in accordance with a program.

18. The integrated motor vehicle equipment component control system of claim 16, the annular ring further comprising a skin, wherein the left actuator is covered by the skin and wherein the right actuator is covered by the skin.

19. The integrated motor vehicle equipment component control system of claim 16, wherein the integrated motor vehicle equipment component control system is installed on a motor vehicle selected from the group consisting of an automobile, a motor vehicle with four-wheel drive, a truck, a motorized farm machine, a military vehicle, a marine vessel, an all-terrain vehicle, and a golf cart.

20. The integrated motor vehicle equipment component control system of claim 16, wherein the left actuator is attached to the steering wheel annular ring with one end of the left actuator oriented towards the 9 o'clock position and an opposite end of the left actuator oriented towards the 12 o'clock position on the annular ring, and wherein the right actuator is attached to the steering wheel annular ring with one end of the right actuator oriented towards the 3 o'clock position and an opposite end of the right actuator oriented towards the 12 o'clock position on the annular ring.

21. The integrated motor vehicle equipment component control system of claim 20, the left actuator further comprising a switch array and the right actuator further comprising a switch array, wherein the controller activates the left and right actuators when thumb-sized patterns of switches in the switch array of each of the left and the right actuators are simultaneously depressed.

22. The integrated motor vehicle equipment component control system of claim 16, further comprising a system controller connected to the controller, the system controller adapted to alter the operation of the motor vehicle equipment component.

23. The integrated motor vehicle equipment component control system of claim 16, wherein the operation is capable of alternating between an autonomous mode and a manual mode.

24. The integrated motor vehicle equipment component control system of claim 16, wherein the sensor system is a driver assistance system.

25. The integrated motor vehicle equipment component control system of claim 16, wherein the sensor system is a steering wheel rotation sensor system.

26. The integrated motor vehicle equipment component control system of claim 16, wherein the sensor system is a lane position detection system.

27. The integrated motor vehicle equipment component control system of claim 16, wherein the sensor system is a lane departure warning system.

28. The integrated motor vehicle equipment component control system of claim 16, wherein the sensor system is a steering wheel angle sensor system.

29. The integrated motor vehicle equipment component control system of claim 16, wherein the sensor system is an electronic stability control system.

30. The integrated motor vehicle equipment component control system of claim 16, wherein the sensor system is an anti-lock braking system.

31. The integrated motor vehicle equipment component control system of claim 16, wherein the sensor system is a steer-by-wire system.

32. The integrated motor vehicle equipment component control system of claim 16, wherein the sensor system is an active steering system.

33. The integrated motor vehicle equipment component control system of claim 16, wherein the sensor system is a power steering system.

34. The integrated motor vehicle equipment component control system of claim 16, wherein the operation includes activation of the sensor system.

35. The integrated motor vehicle equipment component control system of claim 16, wherein the operation includes deactivation of the sensor system.

36. An integrated motor vehicle equipment component control system comprising:
a motor vehicle steering wheel having an annular ring;
a left actuator, the left actuator being attached to the steering wheel annular ring with one end of the left actuator oriented towards a 9 o'clock position and an opposite end of the left actuator oriented towards a 12 o'clock position on the annular ring;
a right actuator, the right actuator being attached to the steering wheel annular ring with one end of the right actuator oriented towards a 3 o'clock position and an opposite end of the left actuator oriented towards the 12 o'clock position on the annular ring;
a controller, the controller connected to the left and right actuators;
a motor vehicle equipment component, the motor vehicle equipment component connected to the controller;
wherein the left actuator and the right actuator do not overlap;
wherein the controller activates the left actuator and the right actuator when the left and the right actuators are depressed simultaneously and held for a pre-set threshold time, thus providing an activated left actuator and an activated right actuator;
wherein an operation of the motor vehicle equipment component is altered when an activated actuator is depressed; and
wherein the operation is capable of alternating between an autonomous mode and a manual mode.

37. The integrated motor vehicle equipment component control system of claim 36, wherein the motor vehicle equipment component is a sensor system.

38. The integrated motor vehicle equipment component control system of claim 37, wherein the controller is programmable.

39. The integrated motor vehicle equipment component control system of claim 38, wherein when the activated actuator is depressed, the operation of the motor vehicle equipment component is altered by the controller in accordance with a program selected by an operator.

40. The integrated motor vehicle equipment component control system of claim 37, the annular ring further comprising a skin, wherein the left actuator is covered by the skin and wherein the right actuator is covered by the skin.

41. The integrated motor vehicle equipment component control system of claim 37, wherein the integrated motor vehicle equipment component control system is installed on a motor vehicle selected from the group consisting of an automobile, a motor vehicle with four-wheel drive, a truck, a motorized farm machine, a military vehicle, a marine vessel, an all-terrain vehicle, and a golf cart.

42. The integrated motor vehicle equipment component control system of claim 37, the left actuator further comprising a switch array and the right actuator further comprising a switch array, wherein the controller activates the left and right actuators when thumb-sized patterns of switches in the switch array of each of the left and the right actuators are simultaneously depressed.

43. The integrated motor vehicle equipment component control system of claim 37, wherein the sensor system is a driver assistance system.

44. The integrated motor vehicle equipment component control system of claim 37, further comprising a system controller connected to the controller, the system controller adapted to alter the operation of the motor vehicle equipment component.

45. The integrated motor vehicle equipment component control system of claim 37, wherein the sensor system is a steering wheel rotation sensor system.

46. The integrated motor vehicle equipment component control system of claim 37, wherein the sensor system is a lane position detection system.

47. The integrated motor vehicle equipment component control system of claim 37, wherein the sensor system is a lane departure warning system.

48. The integrated motor vehicle equipment component control system of claim 37, wherein the sensor system is a steering wheel angle sensor system.

49. The integrated motor vehicle equipment component control system of claim 37, wherein the sensor system is an electronic stability control system.

50. The integrated motor vehicle equipment component control system of claim 37, wherein the sensor system is an anti-lock braking system.

51. The integrated motor vehicle equipment component control system of claim 37, wherein the sensor system is a steer-by-wire system.

52. The integrated motor vehicle equipment component control system of claim 37, wherein the sensor system is an active steering system.

53. The integrated motor vehicle equipment component control system of claim 37, wherein the sensor system is a power steering system.

54. The integrated motor vehicle equipment component control system of claim 37, wherein the operation includes activation of the sensor system.

55. The integrated motor vehicle equipment component control system of claim 37, wherein the operation includes deactivation of the sensor system.

\* \* \* \* \*